(12) United States Patent
Yamazaki et al.

(10) Patent No.: US 8,059,388 B2
(45) Date of Patent: *Nov. 15, 2011

(54) MULTILAYERED CERAMIC CAPACITOR

(75) Inventors: Youichi Yamazaki, Kagoshima (JP);
Hideyuki Osuzu, Kagoshima (JP);
Yoshihiro Fujioka, Kagoshima (JP);
Daisuke Fukuda, Kagoshima (JP)

(73) Assignee: Kyocera Corporation, Kyoto (JP)

( * ) Notice: Subject to any disclaimer, the term of this patent is extended or adjusted under 35 U.S.C. 154(b) by 216 days.

This patent is subject to a terminal disclaimer.

(21) Appl. No.: 12/516,797

(22) PCT Filed: Nov. 29, 2007

(86) PCT No.: PCT/JP2007/073117
§ 371 (c)(1),
(2), (4) Date: May 28, 2009

(87) PCT Pub. No.: WO2008/066140
PCT Pub. Date: Jun. 5, 2008

(65) Prior Publication Data
US 2010/0067171 A1    Mar. 18, 2010

(30) Foreign Application Priority Data

Nov. 29, 2006  (JP) .................................. 2006-321798
Nov. 29, 2006  (JP) .................................. 2006-321800
Jul. 27, 2007   (JP) .................................. 2007-195904

(51) Int. Cl.
*H01G 4/06* (2006.01)

(52) U.S. Cl. ............... 361/321.4; 361/321.1; 361/321.5; 361/313; 361/306.1; 361/306.3

(58) Field of Classification Search ............... 361/321.4, 361/321.1, 321.2, 301.2, 301.4, 311–313, 361/306.1, 306.3, 321.5
See application file for complete search history.

(56) References Cited

U.S. PATENT DOCUMENTS

| | | | |
|---|---|---|---|
| 6,205,015 B1 * | 3/2001 | Wada et al. | 361/321.4 |
| 6,437,969 B2 * | 8/2002 | Mizuno et al. | 361/311 |
| 6,785,121 B2 * | 8/2004 | Nakano et al. | 361/321.2 |
| 6,853,536 B2 * | 2/2005 | Nakamura et al. | 361/321.4 |
| 7,057,876 B2 * | 6/2006 | Fujioka et al. | 361/321.4 |
| 7,433,173 B2 * | 10/2008 | Iwasaki et al. | 361/321.4 |
| 2001/0035563 A1 | 11/2001 | Masumiya et al. | |

(Continued)

FOREIGN PATENT DOCUMENTS

JP    2001-345230    12/2001

(Continued)

*Primary Examiner* — Nguyen T Ha
(74) *Attorney, Agent, or Firm* — Birch, Stewart, Kolasch & Birch, LLP

(57) ABSTRACT

The invention relates to a multilayer ceramic capacitor having dielectric layers and internal electrode layers disposed alternately. The dielectric layers include a dielectric ceramic containing barium titanate as a main component, and also calcium, magnesium, vanadium, manganese, and a rare-earth element. Crystals constituting the dielectric ceramic are constituted by grains containing barium titanate as their main component and containing calcium in a concentration of 0.2 atomic % or less or containing the calcium in a concentration of 0.4 atomic % or more. The crystals grains are also distinct in their relative distributions of magnesium and rare-earth elements between the center of the grain and the surface of the grain. Finally, the relative areas of the two kinds of crystals observed in the plane of a polished surface of the dielectric ceramic are described by a ratio b/(a+b), which is 0.5 to 0.8.

8 Claims, 3 Drawing Sheets

U.S. PATENT DOCUMENTS

| | | |
|---|---|---|
| 2006/0023399 A1 | 2/2006 | Fujioka et al. |
| 2006/0114641 A1 | 6/2006 | Iwasaki et al. |

FOREIGN PATENT DOCUMENTS

| | | |
|---|---|---|
| JP | 2005-277393 | 10/2005 |
| JP | 2005-281066 | 10/2005 |
| JP | 2005-347288 | 12/2005 |
| JP | 2006-041371 | 2/2006 |
| JP | 2006-156450 | 6/2006 |
| JP | 2006-237237 | 9/2006 |
| WO | WO-2006/103954 A1 | 10/2006 |

\* cited by examiner (a)

(b)

(a)

(b)

(c-1)

(c-2)

MULTILAYERED CERAMIC CAPACITOR

The present application is a National Stage application based on PCT application No. PCT/JP2007/073117, filed on Nov. 29, 2007 which claims the benefit of Japanese Patent Applications No. JP 2006-321798, filed on Nov. 29, 2006, JP 2006-321800, filed on Nov. 29, 2006, and JP 2007-195904, filed on Jul. 27, 2007. The contents of all of the above applications are incorporated by reference herein in their entirety.

TECHNICAL FIELD

The present invention relates to a multilayer ceramic capacitor, and, in particular, to a multilayer ceramic capacitor that has a small size and a high capacitance and includes dielectric layers constituted by barium titanate crystal grains having different Ca concentrations.

BACKGROUND ART

With the recent trend toward widespread use of mobile devices such as cellular phones and achievement of higher speed and higher frequency in semiconductor devices serving as main components for personal computers, there is an ever increasing demand for a multilayer ceramic capacitor having a smaller size and a higher capacitance, the multilayer ceramic capacitor being implemented in such electronic devices. To provide such a multilayer ceramic capacitor, attempts have been made to reduce the thickness of dielectric layers constituting a multilayer ceramic capacitor and to increase the number of dielectric layers stacked.

For example, Patent Document 1 describes use of a mixture of a barium titanate powder (BCT powder) in which the A site is partially substituted by Ca and a barium titanate powder (BT powder) containing no Ca as dielectric powders constituting a dielectric ceramic. Such a combined use of two dielectric powders provides a multilayer ceramic capacitor in which fired dielectric layers are constituted by composite grains of crystal grains having a Ca concentration of 0.2 atomic % or less and crystal grains having a Ca concentration of 0.4 atomic % or more, both types of crystal grains containing barium titanate as the main component; and the thickness of the dielectric layers is reduced to 2 μm.

[Patent Document 1] Japanese Unexamined Patent Application Publication No. 2006-156450

DISCLOSURE OF THE INVENTION

Problems to be Solved by the Invention

However, the multilayer ceramic capacitor disclosed in Patent Document 1 above and having dielectric layers constituted by the composite grains has a problem in that the insulation resistance gradually decreases while the capacitor is left in a high temperature environment for evaluation of the high temperature loading life.

Additionally, when the multilayer ceramic capacitor is produced, a capacitor body immediately after firing at a temperature of about 1200° C. in a reducing atmosphere and before formation of external electrodes has dielectric layers that are reduced and do not have practical insulation resistance and have a low relative dielectric constant.

For this reason, such a fired capacitor body generally needs to be subjected to a reoxidation treatment at a lower temperature than the temperature of the firing and in an atmosphere having a higher oxygen concentration than the oxygen concentration of the atmosphere used in the firing.

Such a reoxidation treatment requires similar work, time, and expense to those in the firing step, thereby adding extra cost to the production.

Accordingly, an object of the present invention is to provide a multilayer ceramic capacitor in which a decrease in the insulation resistance over time in a high temperature loading test can be suppressed and a high insulation property and a high relative dielectric constant are provided without a reoxidation treatment step in production steps of the multilayer ceramic capacitor.

Means for Solving the Problems

According to the present invention, a multilayer ceramic capacitor comprises dielectric layers and internal electrode layers disposed alternately, the dielectric layers including a dielectric ceramic containing barium titanate as a main component, calcium, magnesium, vanadium, manganese, and any rare-earth element among dysprosium, holmium, erbium, and yttrium. The crystals constituting the dielectric ceramic include a first crystal group constituted by crystal grains containing the barium titanate as a main component and containing the calcium in a concentration of 0.2 atomic % or less and a second crystal group constituted by crystal grains containing the barium titanate as a main component and containing the calcium in a concentration of 0.4 atomic % or more. Ratios (C2/C1) of concentrations (C2) of the magnesium and the rare-earth element contained in center portions of the crystal grains constituting the first crystal group to concentrations (C1) of the magnesium and the rare-earth element contained in surface layers of the crystal grains constituting the first crystal group are respectively larger than ratios (C4/C3) of concentrations (C4) of the magnesium and the rare-earth element contained in center portions of the crystal grains constituting the second crystal group to concentrations (C3) of the magnesium and the rare-earth element contained in surface layers of the crystal grains constituting the second crystal group. Furthermore, b/(a+b) is 0.5 to 0.8 where, in a polished surface obtained by polishing a surface of the dielectric ceramic, a represents an area of the crystal grains constituting the first crystal group and b represents an area of the crystal grains constituting the second crystal group.

Preferably, the dielectric ceramic further contains zirconium.

A content of the zirconium is preferably 0.2 to 1 molar part in terms of $ZrO_2$ based on 100 molar parts of a total amount of an oxide of the barium (BaO), an oxide of the calcium (CaO), and an oxide of the titanium ($TiO_2$).

A variation coefficient $(x/\sigma) \times 100$ (%) is preferably 40% or less where x represents a mean diameter of the crystal grains constituting the first crystal group and the second crystal group and $\sigma$ represents a standard deviation of diameters of the crystal grains.

A mean diameter of the crystal grains constituting the first crystal group is larger than a mean diameter of the crystal grains constituting the second crystal group.

The dielectric ceramic preferably contains 0.5 to 1 mole of the magnesium in terms of MgO, 0.5 to 1 mole of the rare-earth element in terms of $RE_2O_3$, 0.1 to 0.3 moles of the manganese in terms of MnO, and 0.1 to 0.4 moles of the vanadium in terms of $V_2O_5$, based on 100 moles of titanium constituting the barium titanate and a mean diameter of the crystal grains constituting the first crystal group is larger than a mean diameter of the crystal grains constituting the second crystal group.

The dielectric ceramic preferably contains 0.5 to 1 mole of the magnesium in terms of MgO, 0.5 to 1 mole of the rare-earth element (RE) in terms of $RE_2O_3$, 0.1 to 0.3 moles of the manganese in terms of MnO, and 0.1 to 0.4 moles of the vanadium in terms of $V_2O_5$, based on 100 moles of titanium constituting the barium titanate, the dielectric ceramic further contains zirconium, and a content of the zirconium is 0.2 to 1 molar part in terms of $ZrO_2$ based on 100 molar parts of a total amount of an oxide of the barium (BaO), an oxide of the calcium (CaO), and an oxide of the titanium ($TiO_2$).

The dielectric ceramic preferably contains 0.5 to 1 mole of the magnesium in terms of MgO, 0.5 to 1 mole of the rare-earth element (RE) in terms of $RE_2O_3$, 0.1 to 0.3 moles of the manganese in terms of MnO, and 0.1 to 0.4 moles of the vanadium in terms of $V_2O_5$, based on 100 moles of titanium constituting the barium titanate and a variation coefficient $(x/\sigma) \times 100$ (%) is 40% or less where x represents a mean diameter of the crystal grains constituting the first crystal group and the second crystal group and $\sigma$ represents a standard deviation of diameters of the crystal grains.

Advantages

According to the present invention, dielectric layers constituting a multilayer ceramic capacitor contain vanadium and contain, in a certain proportion, both crystal grains containing barium titanate as a main component and having a Ca concentration of 0.2 atomic % or less (hereinafter, referred to as crystal grains of the first crystal group) and crystal grains containing barium titanate as a main component and having a Ca concentration of 0.4 atomic % or more (hereinafter, referred to as crystal grains of the second crystal group). Additionally, the ratios (C2/C1) of the concentrations (C2) of magnesium and a rare-earth element contained in center portions of the crystal grains constituting the first crystal group to the concentrations (C1) of magnesium and the rare-earth element in surface layers of the crystal grains constituting the first crystal group are respectively larger than the ratios (C4/C3) of the concentrations (C4) of magnesium and the rare-earth element contained in center portions of the crystal grains constituting the second crystal group to the concentrations (C3) of magnesium and the rare-earth element in surface layers of the crystal grains constituting the second crystal group. As a result, the core-shell structure of the crystal grains of the first crystal group is changed and comes to have a high cubicity. The presence of such highly cubic crystal grains of the first crystal group among the crystal grains of the second crystal group can provide dielectric layers having high insulation resistance after being fired, the dielectric layers being constituted by the crystal grains of the first crystal group and the crystal grains of the second crystal group. Thus, the reoxidation treatment step is no longer required and a multilayer ceramic capacitor in which a decrease in the insulation resistance over time in a high temperature loading test is small can be provided.

In a multilayer ceramic capacitor according to the present invention, when a dielectric ceramic contains zirconium, the core-shell structure of the crystal grains constituting the first crystal group has a higher cubicity. Such a multilayer ceramic capacitor also has a higher insulation property after being fired and a higher relative dielectric constant. A decrease in the insulation resistance of such a multilayer ceramic capacitor over time in a high temperature loading test can also be further reduced.

When a variation coefficient $(x/\sigma) \times 100$ representing variation in the diameters of the crystal grains constituting the first crystal group and the crystal grains constituting the second crystal group is 40% or less where x represents a mean diameter of the crystal grains constituting the first crystal group and the crystal grains constituting the second crystal group and $\sigma$ represents a standard deviation of the diameters of these crystal grains, a decrease in the insulation resistance of a multilayer ceramic capacitor after a high temperature loading test can be further reduced.

When the mean diameter of the crystal grains of the first crystal group is larger than the mean diameter of the crystal grains of the second crystal group, a decrease in the insulation resistance of a multilayer ceramic capacitor after a high temperature loading test can be further reduced.

When the dielectric layers contain 0.5 to 1 mole of magnesium in terms of MnO, 0.5 to 1 mole of a rare-earth element in terms of $RE_2O_3$, 0.1 to 0.3 moles of manganese in terms of MnO, and 0.1 to 0.4 moles of vanadium in terms of $V_2O_5$, based on 100 moles of titanium constituting the barium titanate, a decrease in the insulation resistance of a multilayer ceramic capacitor after a high temperature loading test can be further reduced and the capacitance of the multilayer ceramic capacitor can also be increased.

When the dielectric ceramic contains 0.5 to 1 mole of the magnesium in terms of MgO, 0.5 to 1 mole of the rare-earth element (RE) in terms of $RE_2O_3$, 0.1 to 0.3 moles of the manganese in terms of MnO, and 0.1 to 0.4 moles of the vanadium in terms of $V_2O_5$, based on 100 moles of titanium constituting the barium titanate; the dielectric ceramic further contains zirconium; and the content of the zirconium is 0.2 to 1 molar part in terms of $ZrO_2$ based on 100 molar parts of the total amount of an oxide of the barium (BaO), an oxide of the calcium (CaO), and an oxide of the titanium ($TiO_2$), a decrease in the insulation resistance of a multilayer ceramic capacitor after a high temperature loading test can be further reduced and the capacitance of the multilayer ceramic capacitor can also be increased.

When the dielectric ceramic contains 0.5 to 1 mole of the magnesium in terms of MgO, 0.5 to 1 mole of the rare-earth element (RE) in terms of $RE_2O_3$, 0.1 to 0.3 moles of the manganese in terms of MnO, and 0.1 to 0.4 moles of the vanadium in terms of $V_2O_5$, based on 100 moles of titanium constituting the barium titanate; and a variation coefficient $(x/\sigma) \times 100$ (%) is 40% or less where represents the mean diameter of the crystal grains constituting the first crystal group and the second crystal group and $\sigma$ represents the standard deviation of the diameters of the crystal grains, a decrease in the insulation resistance of a multilayer ceramic capacitor after a high temperature loading test can be further reduced and the capacitance of the multilayer ceramic capacitor can also be increased.

BRIEF DESCRIPTION OF DRAWINGS

FIG. 1(*b*) is an enlarged schematic view showing crystal grains and a grain boundary phase in a dielectric layer.

FIG. 2(*b*) is a graph showing the concentration distributions of magnesium and yttrium in crystal grains constituting the second crystal group in dielectric layers constituting a multilayer ceramic capacitor according to the present invention.

BEST MODES FOR CARRYING OUT THE INVENTION

First Embodiment

A multilayer ceramic capacitor according to the present invention will be described in detail on the basis of the schematic sectional view in FIG. 1.

Figure 1:
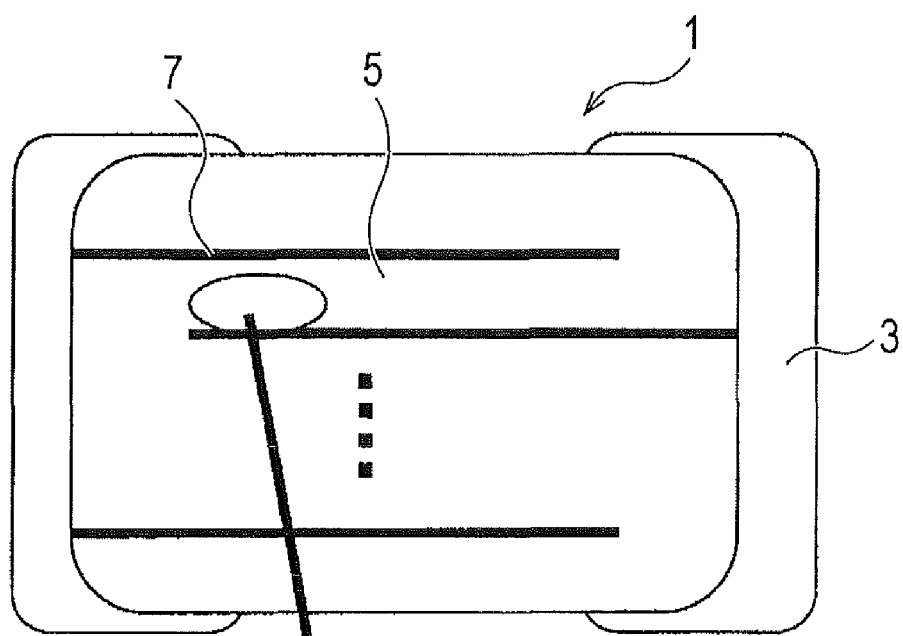
FIG. 1(*a*) is a schematic sectional view showing an example of a multilayer ceramic capacitor according to the present invention.
Figure 1:
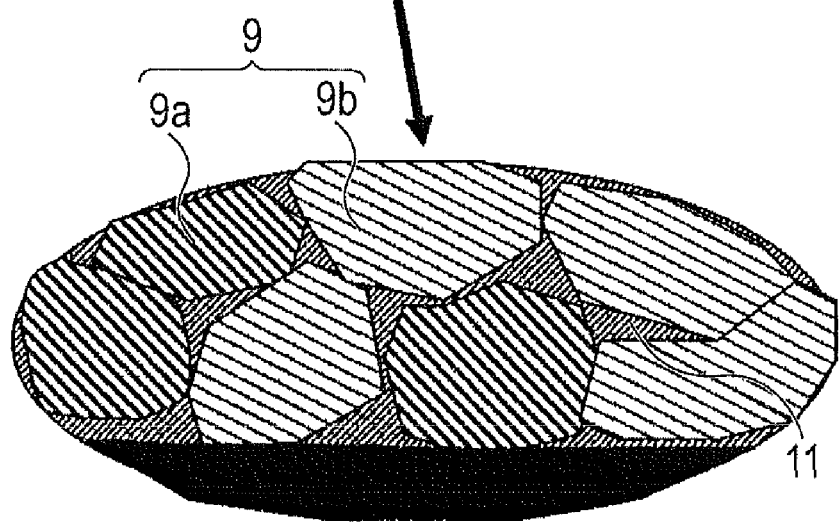

Referring to FIG. 1, a multilayer ceramic capacitor according to the present invention includes external electrodes 3 at both ends of a capacitor body 1. The external electrodes 3 are formed by, for example, baking Cu or an alloy paste containing Cu and Ni.

The capacitor body 1 includes dielectric layers 5 composed of a dielectric ceramic and internal electrode layers 7 disposed alternately. Although FIG. 1 shows a simplified laminate configuration of the dielectric layers 5 and the internal electrode layers 7, a multilayer ceramic capacitor according to the present invention actually includes a laminate constituted by several hundred layers of the dielectric layers 5 and the internal electrode layers 7.

The dielectric layers 5 composed of a dielectric ceramic are constituted by crystal grains 9 and a grain boundary phase 11. These crystal grains 9 are constituted by crystal grains 9a constituting a first crystal group and crystal grains 9b constituting a second crystal group. The dielectric layers 5 composed of these crystal grains 9 preferably have a thickness of 3 μm or less, in particular, 2.5 μm or less. Use of the dielectric layers 5 with such a thickness can provide a multilayer ceramic capacitor having a small size and a high capacitance. When the dielectric layers 5 have a thickness of 1 μm or more, variation in the capacitance can be reduced and the temperature characteristic of the capacitance can be stabilized.

The internal electrode layers 7 are desirably formed of a base metal such as nickel (Ni) or copper (Cu) because a large number of the layers can be laminated at a reduced production cost. In particular, nickel (Ni) is more desirable since the internal electrode layers 7 and the dielectric layers 5 can be cofired in the present invention.

A dielectric ceramic constituting the dielectric layers 5 in a multilayer ceramic capacitor according to the present invention is constituted by a sintered body containing barium titanate as a main component, calcium, magnesium, a rare-earth element (hereinafter, "rare-earth element" refers to any rare-earth element among dysprosium, holmium, erbium, and yttrium), vanadium, and manganese. The crystal grains 9 of the sintered body are constituted by the crystal grains 9a constituting the first crystal group and the crystal grains 9b constituting the second crystal group. The crystal grains 9a contain barium titanate as a main component and have a Ca concentration of 0.2 atomic % or less. The crystal grains 9b also contain barium titanate as a main component and have a Ca concentration of 0.4 atomic % or more.

In particular, the crystal grains having a Ca concentration of 0.4 atomic % or more in the second crystal group 9b preferably have a Ca concentration of 0.5 to 2.5 atomic %. When the Ca concentration is in this range, a sufficiently high amount of Ca can dissolve in barium titanate and the amount of Ca compounds remaining in grain boundaries and the like without dissolving in barium titanate can be reduced. As a result, the relative dielectric constant becomes highly dependent on an AC electric field and hence the crystal grains can be made to have a higher relative dielectric constant. The crystal grains 9a of the first crystal group include crystal grains having a Ca concentration of 0.

The Ca concentration of the crystal grains 9 is obtained by subjecting about 30 crystal grains 9 present in a polished surface obtained by polishing a section of dielectric layers constituting a multilayer ceramic capacitor to elemental analysis with a transmission electron microscope equipped with an elemental analysis device. In this case, the spot size of electron beams is 5 nm. The analysis is conducted at four to five points that are on a straight line drawn from near the grain boundary to the center of each crystal grain 9 and are spaced apart from each other at substantially equal intervals. An average value of the resultant analysis values is determined as the Ca concentration. In this case, the Ca concentration is determined with respect to the total amount (100%) of Ba, Ti, Ca, V, Mg, a rare-earth element, and Mn determined at each measurement point of the crystal grain.

The crystal grains 9 are selected in the following manner. The areas of crystal grains are measured by image processing on the basis of the contours of the grains. The diameters of the grains are calculated as the diameters of circles having the same areas as the grains. Crystal grains that have the resultant diameters within the range of ±30% from the mean crystal grain diameter obtained by a method described below are selected as the crystal grains 9.

The centers of the crystal grains 9 are defined as the centers of the inscribed circles of the crystal grains 9. "Near grain boundary of a crystal grain" refers to a region within 5 nm inward from the grain boundary of the crystal grain 9. An image projected in a transmission electron microscope is input into a computer and the inscribed circles of the crystal grains 9 are drawn on the image on the screen of the computer. Thus, the centers of the crystal grains are determined.

Figure 2:
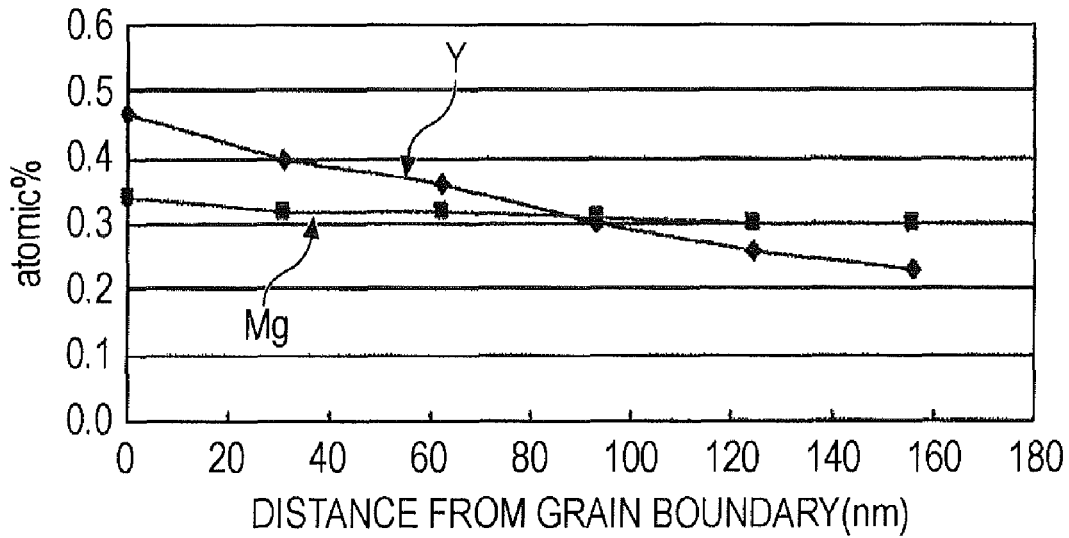
FIG. 2(*a*) is a graph showing the concentration distributions of magnesium and yttrium in crystal grains constituting the first crystal group in dielectric layers constituting a multilayer ceramic capacitor according to the present invention.
Figure 2:
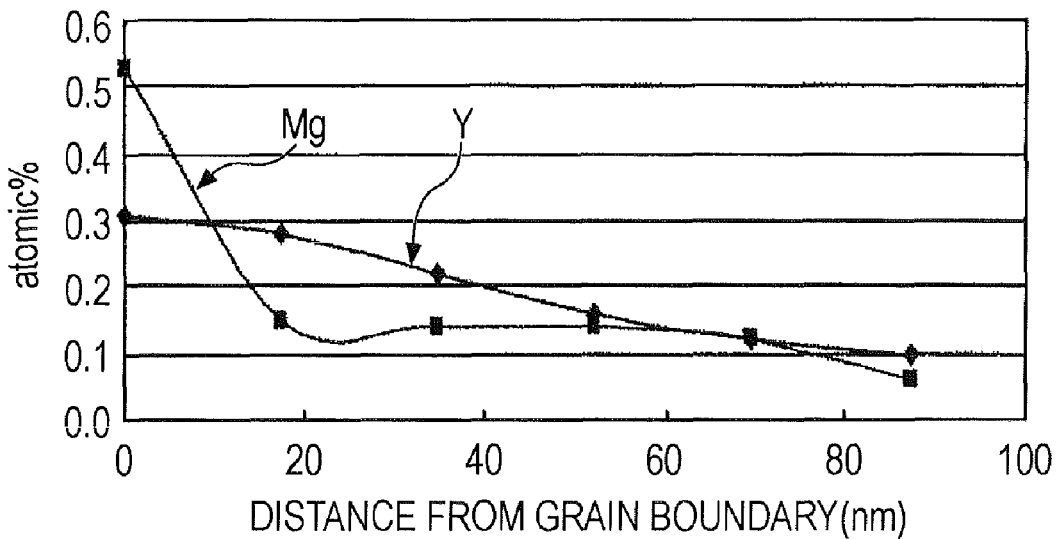

FIG. 2(a) is a graph showing the concentration distributions of magnesium and yttrium in crystal grains constituting the first crystal group 9a in dielectric layers constituting a multilayer ceramic capacitor according to the present invention. FIG. 2(b) is a graph showing the concentration distributions of magnesium and yttrium in crystal grains constituting the second crystal group 9b in dielectric layers constituting a multilayer ceramic capacitor according to the present invention. These examples are obtained by evaluating Sample No. I-5 in Example I described below. In FIGS. 2(a) and 2(b), "0 nm" denotes the surface layers of the crystal grains 9, the surface layers being the interfaces between the crystal grains 9 and the grain boundaries; and the abscissa axes indicate depth from the surfaces of the crystal grains into the crystal grains.

FIGS. 2(a) and 2(b) indicate the following findings. The concentrations of magnesium and yttrium vary more mildly from the surface layers to the center portions of the crystal grains in the crystal grains 9a constituting the first crystal group than in the crystal grains 9b constituting the second crystal group. The concentrations of magnesium and yttrium considerably vary from the surfaces to the center portions of the crystal grains 9b of the second crystal group.

These findings indicate that magnesium and yttrium further diffuse and dissolve to the inside of crystal grains in the crystal grains 9a of the first crystal group than in the crystal grains 9b of the second crystal group. Thus, the crystal grains 9a of the first crystal group have high cubicity.

According to the present invention, in a dielectric ceramic constituting the dielectric layers 5, the ratios of the concentrations of magnesium and a rare-earth element contained in the center portions of the crystal grains 9a constituting the first crystal group to the concentrations of magnesium and the rare-earth element contained in the surface layers of the crystal grains 9a constituting the first crystal group are respectively made larger than the ratios of the concentrations of magnesium and the rare-earth element contained in the center portions of the crystal grains 9b constituting the second crystal group to the concentrations of magnesium and the rare-earth element contained in the surface layers of the crystal grains 9b constituting the second crystal group.

The reason for this is as follows. When the ratios of the concentrations of magnesium and a rare-earth element contained in the center portions of crystal grains constituting the first crystal group to the concentrations of magnesium and the rare-earth element in the surface layers of the crystal grains constituting the first crystal group are respectively equal to or smaller than the ratios concentrations of magnesium and the rare-earth element contained in the center portions of crystal grains constituting the second crystal group to the concentrations of magnesium and the rare-earth element in the surface layers of the crystal grains constituting the second crystal group, the amount of magnesium and the rare-earth element dissolving in the crystal grains 9a of the first crystal group is small. Thus, a dielectric ceramic including such crystal grains 9a is susceptible to reduction when being fired and hence the resultant dielectric ceramic after being fired has low insulation resistance.

In contrast, when the ratios of the concentrations (C2/C1) of magnesium and a rare-earth element contained in the center portions of the crystal grains 9a constituting the first crystal group to the concentrations of magnesium and the rare-earth element in the surface layers of the crystal grains 9a constituting the first crystal group are respectively made larger than the ratios of the concentrations of magnesium and the rare-earth element contained in the center portions of the crystal grains 9b constituting the second crystal group to the concentrations of magnesium and the rare-earth element in the surface layers of the crystal grains 9b constituting the second crystal group, the amount of magnesium and the rare-earth element dissolving in the crystal grains 9a of the first crystal group becomes large. As a result of containing both such crystal grains 9a of the first crystal group and the crystal grains 9b of the second crystal group, a dielectric ceramic can be made to have high insulation resistance even after being fired and a decrease in the insulation resistance over time in a high temperature loading test can be reduced.

When the crystal grains 9 constituting a dielectric ceramic include both the crystal grains 9a of the first crystal group and the crystal grains 9b of the second crystal group as described above, the resultant multilayer ceramic capacitor becomes resistant to reduction even when being subjected to a reduction treatment again and the multilayer ceramic capacitor can maintain high insulation resistance.

The ratios of the concentrations of magnesium and a rare-earth element are measured with a transmission electron microscope equipped with an elemental analysis device (EDS). In this case, samples to be analyzed are obtained by polishing a multilayer ceramic capacitor and selecting the crystal grains 9a of the first crystal group and the crystal grains 9b of the second crystal group on the thus-polished surface of the dielectric layers 5, the crystal grains 9a and the crystal grains 9b being determined in accordance with the measurement of the Ca concentration described above.

The crystal grains 9a and 9b are selected in the following manner. The areas of crystal grains are measured by image processing on the basis of the contours of the grains. The diameters of the grains are calculated as the diameters of circles having the same areas as the grains. Crystal grains that have diameters within the range of ±30% from the mean crystal grain diameter obtained by a measurement method described below are selected as the crystal grains 9a and 9b. Ten crystal grains in this range are respectively selected in terms of the crystal grains 9a of the first crystal group and the crystal grains 9b of the second crystal group.

The spot size of electron beams in elemental analysis is 1 to 3 nm. The analysis is conducted for the surface layer and the center portion of a crystal grain. The surface layer of a crystal grain is defined as a region within 3 nm from the grain boundary of the crystal grain in a section of the crystal grain. The center portion of a crystal grain is defined as a region within a circle having its center at the center of the inscribed circle of the crystal grain in a section of the crystal grain and having a radius of ⅓ of the radius of the inscribed circle. In this case, the inscribed circle of the crystal grain is drawn on an image projected in a transmission electron microscope on the screen of a computer. On the basis of the image on the screen, the center portion of the crystal grain is determined.

The concentrations of magnesium and a rare-earth element (CM1 and CR1) in the surface layers of the crystal grains 9a and the concentrations of magnesium and the rare-earth element (CM2 and CR2) in the center portions of the crystal grains 9a are then determined. The concentrations of magnesium and the rare-earth element (CM3 and CR3) in the surface layers of the crystal grains 9b and the concentrations of magnesium and the rare-earth element (CM4 and CR4) in the center portions of the crystal grains 9b are also determined. On the basis of the thus-measured concentrations of magnesium and the rare-earth element in the crystal grains, the concentration ratios (CM2/CM1, CR2/CR1, CM4/CM3, and CR4/CR3) of magnesium and the rare-earth element between the surface layers and the center portions of the crystal grains 9a and 9b are obtained. Specifically, ten crystal grains are each subjected to this procedure and the average values of the resultant values are used.

In the present invention, the concentration ratios are adjusted so as to satisfy (CM2/CM1)>(CM4/CM3) and (CR2/CR1)>(CR4/CR3). Specifically, (CM2/CM1) is preferably 1.5 to 12 times (CM4/CM3); and (CR2/CR1) is preferably 1.005 to 2 times (CR4/CR3). In the present invention, C1 corresponds to CM1 and CR1; C2 corresponds to CM2 and CR2; C3 corresponds to CM3 and CR3; and C4 corresponds to CM4 and CR4.

In a multilayer ceramic capacitor according to the present invention, a dielectric ceramic constituting the dielectric layers 5 has b/(a+b) of 0.5 to 0.8 where a represents the area of the crystal grains 9a of the first crystal group and b represents the area of the crystal grains 9b of the second crystal group in a polished surface obtained by polishing a surface of the dielectric ceramic.

Specifically, when b/(a+b) is less than 0.5 or more than 0.8, such a multilayer ceramic capacitor can have an insulation resistance of less than $10^7$ Ω immediately after being fired in a reducing atmosphere or in the case of being subjected to a reoxidation treatment and subsequently to a reduction treatment again. When the area proportion satisfies b/(a+b) of 0.5 to 0.8, the insulation resistance of such a multilayer ceramic capacitor can be increased to $10^7$ Ω or more immediately after being fired in a reducing atmosphere, and such a multilayer ceramic capacitor can be made to have an insulation resistance of $10^7$ Ω or more even in the case of being subjected to a reoxidation treatment and subsequently to a reduction treatment again.

The proportion of the area of the crystal grains 9a of the first crystal group and the area of the crystal grains 9b of the second crystal group is calculated from the areal data used when the mean diameter of crystal grains is determined above. In this case, crystal grains having a Ca concentration of 0.2 atomic % or less are categorized as the crystal grains 9a of the first crystal group and crystal grains having a Ca concentration of 0.4 atomic % or more are categorized as the crystal grains 9b of the second crystal group.

It is important that such a dielectric ceramic contains 0.3 to 1.5 moles of magnesium in terms of MgO, 0.3 to 1.5 moles of a rare-earth element in terms of $RE_2O_3$, 0.07 to 0.4 moles of manganese in terms of MnO, and 0.05 to 0.5 moles of vanadium in terms of $V_2O_5$, based on 100 moles of titanium constituting barium titanate. In particular, such a dielectric ceramic desirably contains 0.5 to 1 mole of magnesium in terms of MgO, 0.5 to 1 mole of a rare-earth element in terms of $RE_2O_3$, 0.1 to 0.3 moles of manganese in terms of MnO, and 0.1 to 0.4 moles of vanadium in terms of $V_2O_5$, based on 100 moles of titanium constituting barium titanate.

This is because a dielectric ceramic after being subjected to reduction firing has an insulation resistance of less than $10^7 \Omega$ when the content of vanadium is less than 0.05 moles or more than 0.5 moles in terms of $V_2O_5$ based on 100 moles of titanium constituting barium titanate contained in the dielectric ceramic; when the content of magnesium is less than 0.3 moles or more than 1.5 moles based on 100 moles of titanium constituting barium titanate contained in the dielectric ceramic; when the content of a rare-earth element is less than 0.3 moles or more than 1.5 moles in terms of $RE_2O_3$ based on 100 moles of titanium constituting barium titanate contained in the dielectric ceramic; or when the content of manganese is less than 0.07 moles in terms of MnO based on 100 moles of titanium constituting barium titanate contained in the dielectric ceramic. Additionally, a dielectric ceramic has a low relative dielectric constant when the content of manganese is more than 0.4 moles in terms of MnO based on 100 moles of titanium constituting barium titanate contained in the dielectric ceramic.

By satisfying the composition described above, the relative dielectric constant and the insulation resistance of the dielectric layers 5 can be increased. As a result, the capacitance of a multilayer ceramic capacitor including such dielectric layers 5 can be increased and the reliability of such a multilayer ceramic capacitor in a high temperature loading test can also be enhanced.

A rare-earth element contained in the crystal grains 9 is preferably any rare-earth element among dysprosium, holmium, erbium, and yttrium. In particular, yttrium is more preferable because the presence of yttrium in a dielectric ceramic increases its relative dielectric constant. Note that yttrium is categorized as a rare-earth element in the present invention.

In addition to the components such as calcium, vanadium, magnesium, a rare-earth element, and manganese, a glass component may be added as an auxiliary for enhancing the sintering property as long as desired dielectric characteristics can be maintained.

The mean diameter of the crystal grains 9a of the first crystal group is preferably larger than the mean diameter of the crystal grains 9b of the second crystal group. More preferably, in the present invention, the mean diameter of the crystal grains 9a of the first group is larger than the mean diameter of the crystal grains 9b of the second group by 0.02 μm or more. When the dielectric layers 5 contain both the crystal grains 9a of the first crystal group and the crystal grains 9b of the second crystal group, the crystal grains 9a having high cubicity and high insulation resistance and being larger than the crystal grains 9b, the dielectric layers 5 can have further increased insulation resistance.

The mean diameter of the crystal grains 9a of the first crystal group and the crystal grains 9b of the second crystal group is preferably 0.45 μm or less. In this case, a high insulation property can be provided even when the thickness of the dielectric layers 5 is reduced and higher capacitance can also be achieved. The crystal grains 9 preferably have a grain diameter of 0.15 μm or more. This increases the relative dielectric constant of the dielectric layers 5 and decreases the temperature dependency of the relative dielectric constant, which are advantageous.

The mean diameter of the crystal grains 9a constituting the first crystal group and the mean diameter of the crystal grains 9b constituting the second crystal group, the first crystal group and the second crystal group constituting the dielectric layers, are calculated from the areal data of the crystal grains 9a constituting the first crystal group and the crystal grains 9b constituting the second crystal group, the areal data being obtained when the Ca concentration is determined above. In this case, an image of a polished surface obtained by polishing a section of the dielectric layers, the image being projected in a transmission electron microscope, is input into a computer. The contours of crystal grains on the screen of the computer are subjected to image processing and the areas of the crystal grains are measured. The diameters of the grains are calculated as the diameters of circles having the same areas as the grains. Each mean diameter is obtained as a mean value of the thus-calculated diameters of about 50 crystal grains.

The mean diameter of the whole crystal grains 9 constituted by the crystal grains 9a constituting the first crystal group and the crystal grains 9b constituting the second crystal group is determined as follows. An image of a polished surface obtained by polishing a section of the dielectric layers 5, the image being projected in a transmission electron microscope, is input into a computer. A diagonal line is drawn on the image on the screen of the computer and the areas of crystal grains on the diagonal line are measured by subjecting the contours of the grains to image processing. The diameters of the grains are calculated as the diameters of circles having the same areas as the grains. The mean diameter is obtained as a mean value of the thus-calculated diameters of about 50 crystal grains.

In the present invention, a dielectric ceramic preferably contains zirconium. In particular, the content of the zirconium is more preferably 0.2 to 1 molar part in terms of $ZrO_2$ based on 100 molar parts of the total amount of an oxide of the barium (BaO), an oxide of the calcium (CaO), and an oxide of the titanium ($TiO_2$).

In the multilayer ceramic capacitor of the first embodiment, the crystal grains 9a constituting the first crystal group and the crystal grains 9b constituting the second crystal group, the first and the second crystal groups constituting the dielectric layers 5, may contain zirconium.

In this case, the dielectric layers 5 contain zirconium in the form of an oxide ($ZrO_2$). The dielectric layers 5 preferably contain 0.2 to 1 molar part of the zirconium in terms of $ZrO_2$ based on 100 molar parts of the total amount of an oxide of barium (BaO), an oxide of calcium (CaO), and an oxide of titanium ($TiO_2$), these oxides being contained in barium titanate crystal grains and barium calcium titanate crystal grains constituting the dielectric layers 5. When the dielectric layers 5 contain 0.2 or more molar parts of $ZrO_2$, such dielectric layers 5 have an increased relative dielectric constant, which is advantageous. When the dielectric layers 5 contain 1 or less molar part of $ZrO_2$, such dielectric layers 5 can have reduced temperature dependent variation of the relative dielectric constant, which is advantageous.

Hereinafter, a method for producing a multilayer ceramic capacitor according to the present invention is described on the basis of FIG. 3.

Figure 3:
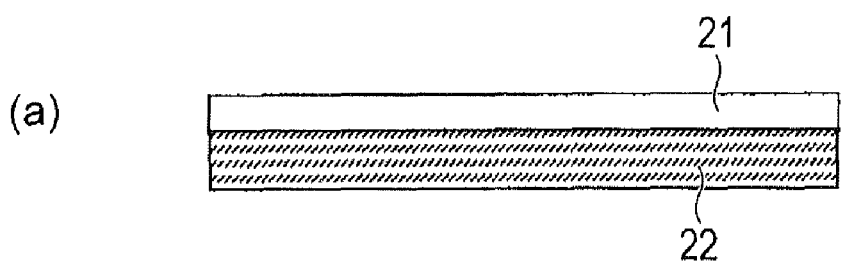
FIG. 3 is a process chart showing an example of a method for producing a multilayer ceramic capacitor according to the present invention.
Figure 3:
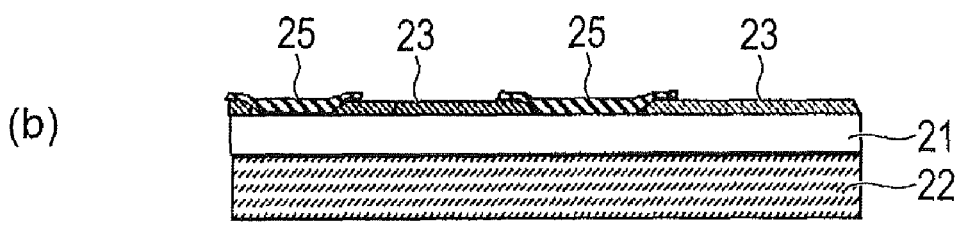
Figure 3:
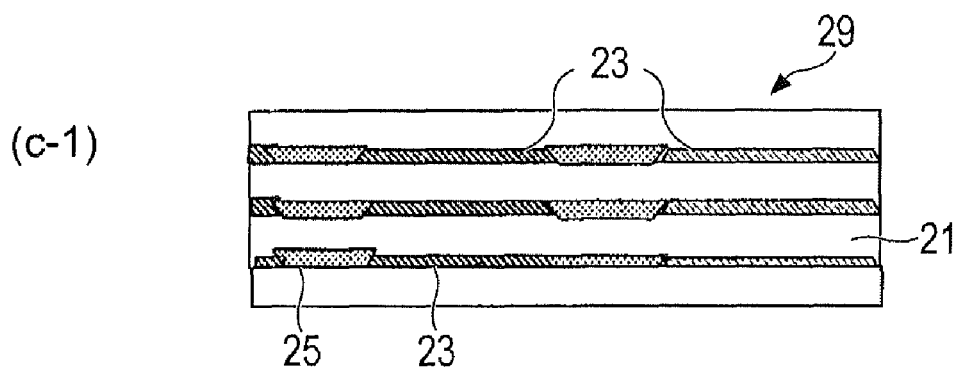
Figure 3:
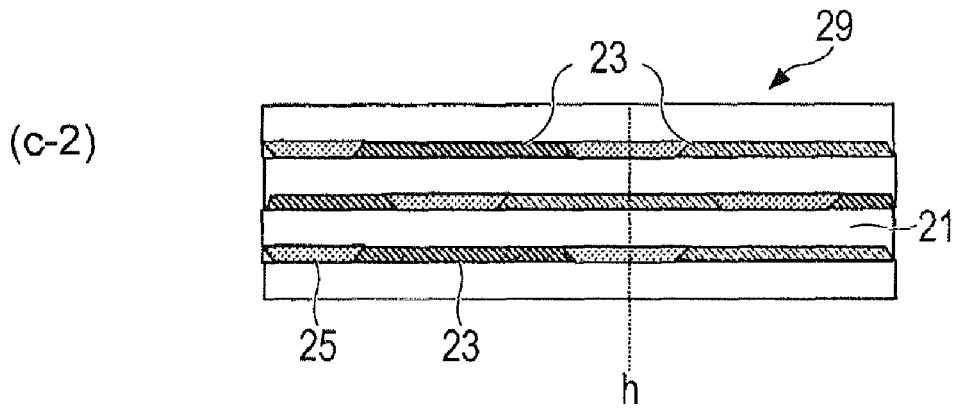

FIG. 3 is a process chart showing a method for producing a multilayer ceramic capacitor according to the present invention.

Step (a): a ceramic slurry is prepared by mixing material powders described below, an organic resin such as a polyvinyl butyral resin, and solvents such as toluene and alcohol with a ball mill. Ceramic green sheets 21 are then formed with the thus-prepared ceramic slurry by a sheet forming method such as a doctor blade method or a die coater method. The ceramic green sheets 21 preferably have a thickness of 1 to 4 μm so that the thickness of the dielectric layers 5 is reduced to provide high capacitance and a high insulation property is maintained.

The material powders used are a barium titanate powder (hereinafter, referred to as a BT powder), a powder in which calcium dissolves in barium titanate (hereinafter, referred to as a BCT powder), a $V_2O_5$ powder, a MgO powder, a powder of an oxide of a rare-earth element, and a $MnCO_3$ powder, these powders having a purity of 99% or more. In this case, since a high relative dielectric constant can be provided, the BT powder to be turned into the crystal grains 9a of the first crystal group by firing and the BCT powder to be turned into the crystal grains 9b of the second crystal group by firing preferably have a mean particle diameter of 0.05 to 0.4 μm.

The $V_2O_5$ powder, the MgO powder, the powder of an oxide of a rare-earth element, and the $MnCO_3$ powder, which are additives, also preferably have a mean particle diameter equal to or smaller than the mean particle diameter of the BT powder or the BCT powder.

The BCT powder is a solid solution mainly containing barium titanate in which the A site is partially substituted by Ca. The BCT powder is represented by $(Ba_{1-x}Ca_x)TiO_3$. In this composition formula, the amount of Ca substitution at the A site preferably satisfies X=0.01 to 0.2. When the amount of Ca substitution is in this range, the structure containing both the crystal grains 9a of the first crystal group and the crystal grains 9b of the second crystal group can provide a crystalline structure in which growth of the crystal grains is suppressed. Ca contained in the crystal grains 9b of the second crystal group dissolves so as to disperse in the second crystal grains 9b.

The BCT powder containing A site (barium) and B site (titanium) preferably has an atomic ratio A/B of 1.003 or more. The BT powder preferably has an A/B of 1.002 or less. When the BT powder has an A/B of 1.002 or less, additives such as Mg and a rare-earth element dissolve in barium titanate to a higher degree, which is advantageous.

The BT powder to be turned into the crystal grains 9a of the first crystal group and the BCT powder to be turned into the crystal grains 9b of the second crystal group are then mixed such that the ratio between the BT powder and the BCT powder by mass is 30:70 to 70:30.

The BT powder and the BCT powder are synthesized by mixing compounds containing a Ba component, a Ca component, and a Ti component so as to achieve certain compositions. These dielectric powders are obtained by a synthetic method selected from a solid phase method, a liquid phase method (including a generation method via oxalate), a hydrothermal synthesis method, and the like. In particular, a dielectric powder obtained by a hydrothermal synthesis method is preferable because such a dielectric powder has narrow particle size distribution and high crystallinity.

The additives are preferably added to a mixed powder of the BT powder and the BCT powder such that, based on 100 molar parts of a dielectric powder that is a mixture of the BT powder and the BCT powder, the amount of Mg is 0.4 to 1.5 molar parts in terms of MgO, the amount of a rare-earth element (RE) is 0.3 to 1.5 molar parts in terms of $RE_2O_3$, the amount of Mn is 0.07 to 0.4 molar parts in terms of MnO, and the amount of vanadium is 0.05 to 0.5 molar parts in terms of $V_2O_5$; in particular, the amount of Mg is 0.5 to 1 molar part in terms of MgO, the amount of a rare-earth element is 0.5 to 1 molar part in terms of $RE_2O_3$, the amount of Mn is 0.1 to 0.3 molar parts in terms of MnO, and the amount of vanadium is 0.1 to 0.4 molar parts in terms of $V_2O_5$.

As described above, when a multilayer ceramic capacitor according to the present invention is produced, a $V_2O_5$ powder as well as a MgO powder, a powder of an oxide of a rare-earth element, and a $MnCO_3$ powder are added to a mixed powder of a BT powder and a BCT powder.

In the present invention, when a $V_2O_5$ powder is added to a mixed powder of a BT powder and a BCT powder, the vanadium component contained in the $V_2O_5$ powder increases the amount of magnesium and a rare-earth element dissolving in the BT powder and at least provides an effect of causing grain growth in the BT powder in which magnesium and the rare-earth element dissolve. In this case, the amount of magnesium and the rare-earth element dissolving in the BCT powder is less than that in the BT powder. The degree of grain growth in the BCT powder is also less than that in the BT powder. As a result, the crystal grains 9a of the first crystal group generated from the BT powder have a mean diameter larger than that of the second crystal grains 9b generated from the BCT powder. Additionally, the dissolution amount of magnesium and the rare-earth element in the BT powder can be increased. Thus, the crystal grains 9a of the first crystal group are highly insulated in the dielectric layers 5 and hence the insulation property of the dielectric layers can be enhanced.

A zirconium oxide (hereinafter, referred to as a $ZrO_2$ powder) is further added to the dielectric powder. $ZrO_2$ to be added is preferably a $ZrO_2$ powder having a purity of 99.9% or more. In this case, the $ZrO_2$ powder preferably has a mean particle diameter of 0.1 to 1 μm. The amount of the $ZrO_2$ powder to be added is preferably 0.1 to 1 molar part based on 100 molar parts of the dielectric powder, which is a mixture of the BCT powder and the BT powder.

In the production of a multilayer ceramic capacitor according to the present invention, a glass powder may be added as a sintering auxiliary as long as desired dielectric characteristics can be maintained. Such a glass powder is preferably composed of $Li_2O$, $SiO_2$, BaO, and CaO, and the composition of the glass powder is preferably $Li_2O$=1 to 15 mole %, $SiO_2$=40 to 60 mole %, BaO=15 to 35 mole %, and CaO=5 to 25 mole %. The amount of such a glass powder to be added is preferably 0.5 to 2 parts by mass based on 100 parts by mass of the dielectric powder, which is a mixture of the BCT powder and the BT powder. In this case, the sintering property of dielectric layers can be enhanced while the grain growth of crystal grains can be suppressed.

Step (b): Next, internal electrode patterns 23 having the shape of a rectangle are formed by printing on main surfaces of the ceramic green sheets 21 obtained above. A conductor paste with which the internal electrode patterns are formed is prepared by mixing Ni, Cu, or an alloy powder of Ni and Cu as a main metal component and a ceramic powder as another component, and adding an organic binder, a solvent, and a dispersing agent to the resultant mixture.

A preferred metal powder is composed of Ni because such a metal powder can be cofired with the BT powder and the BCT powder, thereby reducing the cost. The ceramic powder is preferably a BT powder having a low Ca concentration. A columnar ceramic penetrating the internal electrode layers 7 is formed with a conductor paste containing a ceramic powder. As a result, separation between the dielectric layers 5 and the internal electrode layers 7 can be prevented. The internal electrode patterns 23 preferably have a thickness of 1 μm or less to reduce the size of the resultant multilayer ceramic capacitor and to reduce the irregularities generated by the internal electrode patterns 23.

In the present invention, to overcome the irregularities generated by the internal electrode patterns 23 on the ceramic green sheets 21, ceramic patterns 25 are preferably formed around the internal electrode patterns 23 so as to have substantially the same thickness as that of the internal electrode patterns 23. The ceramic component of the ceramic patterns 25 preferably has the same composition as that of the dielectric powder for forming the ceramic green sheets to provide the same firing shrinkage in cofiring.

Step (c): Next, a quasi-laminate of the ceramic green sheets 21 is formed by stacking a desired number of the ceramic green sheets 21 on which the internal electrode patterns 23 are formed and further stacking a plurality of ceramic green sheets 21 without the internal electrode patterns 23 on the top and the bottom of the resultant stack so that the number of the ceramic green sheets 21 without the internal electrode patterns 23 stacked on the top is the same as that on the bottom. The internal electrode patterns 23 in the quasi-laminate are staggered by a distance corresponding to a half pattern in the longitudinal direction. Such a stacking manner will provide a laminate having the internal electrode patterns 23 exposed alternately on the end surfaces of the laminate after being cut.

Other than the manner of stacking the ceramic green sheets 21 on the main surfaces of which the internal electrode patterns 23 are formed in advance, such a quasi-laminate in the present invention can also be formed by sequentially bringing the ceramic green sheet 21 into close contact with a lower base and printing the internal electrode pattern 23 on this ceramic green sheet 21. Specifically, the ceramic green sheet 21 is brought into close contact with a lower base, the internal electrode pattern 23 is subsequently printed on this ceramic green sheet 21, the internal electrode pattern 23 is dried, and the ceramic green sheet 21 on which no internal electrode pattern 23 is printed is subsequently placed on the thus-printed-and-dried internal electrode pattern 23 to temporarily being brought into close contact with the internal electrode pattern 23.

The quasi-laminate is subsequently pressed under conditions at higher temperature and at higher pressure than the temperature and the pressure in the stacking described above. As a result, a laminate 29 is formed in which the ceramic green sheets 21 and the internal electrode patterns 23 are strongly bonded to each other.

The laminate 29 is then cut along a cutting plane line h. Specifically, the laminate 29 is cut at substantially the center of a ceramic pattern 29 formed in the laminate 29 in a direction ((c-1) in FIG. 3 and (c-2) in FIG. 3) perpendicular to the longitudinal direction of the internal electrode patterns 23 and in a direction parallel to the longitudinal direction of the internal electrode patterns 23 such that a capacitor compact body having exposed ends of the internal electrode patterns 23 is formed. In this case, the internal electrode patterns 23 are not exposed on the side margin sides of the capacitor compact body.

The capacitor compact body is subsequently fired in a certain atmosphere and under a certain temperature condition to form a capacitor body 1. The capacitor body may be chamfered for the edge line portions and the capacitor body 1 may also be subjected to barrel polishing to expose the internal electrode layers at opposite end surfaces of the capacitor body 1.

The firing is conducted under the following conditions. A sample is degreased at a heating rate of 5° C./h to 20° C./h in a temperature range up to 500° C. The sample is subsequently fired at a heating rate of 200° C./h to 500° C./h in a reducing atmosphere of a mixed gas of hydrogen-nitrogen in a range of 1100° C. to 1250° C. for 0.5 to 4 hours. The thus-fired sample is further subjected to a reoxidation treatment in nitrogen at 900° C. to 1100° C.

An external electrode paste is then applied to the opposite ends of the capacitor body 1 and the applied paste is baked to form the external electrodes 3. To enhance the implementation property, a plated film is formed on the surfaces of the external electrodes 3.

Second Embodiment

Hereinafter, a second embodiment of the present invention is described, however, descriptions overlapping those in the first embodiment may be omitted. In the second embodiment, the variation coefficient, being represented by $x/\sigma$, of the diameters of the crystal grains 9 constituting a multilayer ceramic capacitor is preferably 40% or less where x represents the mean diameter of the crystal grains 9 and $\sigma$ represents the standard deviation of the diameters of the crystal grains 9.

When the variation coefficient of the diameters of the crystal grains 9 is 40% or less, a decrease in the insulation resistance over time in a high temperature loading test can be suppressed, which is advantageous.

More preferably, the variation coefficient of the diameters of the crystal grains 9 is 37% or less. When the variation coefficient of the diameters of the crystal grains 9 is 37% or less, the insulation resistance after the lapse of 100 hours under a high temperature loading test can be maintained at $2 \times 10^7$ Ω or more and the relative dielectric constant of the dielectric layers 5 can be increased to 4100 or more, which is advantageous.

To provide the variation coefficient in the range described above, the mean diameter of the crystal grains 9b constituting the second crystal group is preferably 0.13 to 0.17 μm and the mean diameter of the crystal grains 9a constituting the first crystal group is preferably 0.23 to 0.35 μm.

In the second embodiment, material powders used include a coarse barium titanate powder (BCT powder) in which the A site is partially substituted by Ca and a coarse barium titanate powder (BT powder) containing no Ca. A fine barium titanate powder having a mean particle diameter of ½ or less of the mean particle diameter of a mixture of the BT powder and the BCT powder is further added to the coarse powders.

When a certain amount of a fine BT powder having a mean particle diameter of ½ or less of the mean particle diameter of the BT powder and the BCT powder is added to a dielectric powder mainly composed of the BT powder and the BCT powder, the fine BT powder is sintered by firing together with the BT powder and the BCT powder that have relatively small particle diameters among the coarse BT powder and the coarse BCT powder. As a result, grain growth in the crystal grains constituting the first crystal group and the crystal grains constituting the second crystal group after the firing seems to be suppressed. Thus, the resultant crystal grains have a relatively uniform diameter.

When such a fine BT powder is not added, the variation coefficient of the diameters of both the crystal grains constituting the first crystal group and the crystal grains constituting the second crystal group after firing is more than 40% and a decrease in the insulation resistance after the lapse of 100 hours under a high temperature loading test tends to become large.

Such a fine barium titanate powder (BT powder) preferably has a mean particle diameter of 20 to 60 nm, and preferably has a minimum particle diameter of 10 nm or more and a maximum particle diameter of 80 nm or less on the basis of ranges accounting for 3% or more proportion in the particle size distribution. That is, the fine barium titanate powder preferably has a mean diameter smaller than the mean diameter of the BT powder and the BCT powder, which are the main components of the dielectric powder. The amount of the fine powder to be added is properly determined on the basis of the size of the coarse dielectric powder.

The amount of the fine powder to be added is preferably 5 to 15 parts by mass based on 100 parts by mass of the BT powder and the BCT powder, which are the main components of the dielectric powder.

With the ceramic powder used in the second embodiment, abnormal grain growth in a columnar ceramic in firing can be suppressed and the mechanical strength can be enhanced. Suppression of abnormal grain growth in a columnar ceramic to be formed in the internal electrode layers also permits reduction in the temperature dependency of the capacitance of a multilayer ceramic capacitor. To reduce the size of a multilayer ceramic capacitor and to reduce the irregularities generated by the internal electrode patterns 23, the internal electrode patterns 23 preferably have a thickness of 1 μm or less.

Other features are the same as those in the first embodiment and hence the descriptions thereof are omitted.

EXAMPLES

Hereinafter, the present invention is described in further detail with reference to examples. However, the present invention is not restricted to the following examples.

Example I

The following material powders were prepared and mixed in accordance with the proportions shown in Table 1: a BT powder, a BCT powder ($Ba_{0.95}Ca_{0.05}TiO_3$), MgO, $MnCO_3$, $V_2O_5$, and powders of oxides of rare-earth elements. These material powders had a purity of 99.9%. The BT powder and the BCT powder had a mean particle diameter of 100 nm in Sample Nos. 1 to 22 and 24 to 27 in Table 1. In Sample No. 23, the BT powder had a mean particle diameter of 100 nm and the BCT powder had a mean particle diameter of 150 nm. The Ba/Ti ratio of the BT powder was 1.001 and the Ba/Ti ratio of the BCT powder was 1.003. A glass powder having a composition of $SiO_2$=55, BaO=20, CaO=15, and $Li_2O$=10 (mole %) was used as a sintering auxiliary. The amount of the glass powder added was 1 part by mass based on the 100 parts by mass of the BT powder and the BCT powder.

A mixed solvent of toluene and alcohol was added to these material powders and the resultant mixture was wet blended with zirconia balls having a diameter of 5 mm.

A polyvinyl butyral resin and a mixed solvent of toluene and alcohol were added to the thus-wet-blended powders and the resultant mixture was also wet blended with zirconia balls having a diameter of 5 mm to prepare a ceramic slurry. Ceramic green sheets having a thickness of 3 μm were produced with the ceramic slurry by a doctor blade method.

A plurality of rectangular internal electrode patterns containing Ni as the main component were formed on the upper surfaces of the ceramic green sheets. A conductor paste used for forming the internal electrode patterns contained a Ni powder having a mean particle diameter of 0.3 μm. The conductor paste also contained 30 parts by mass of the BT powder used for the green sheets based on 100 parts by mass of the Ni powder.

Then, 360 ceramic green sheets on which the internal electrode patterns were printed were stacked and 20 ceramic green sheets on which no internal electrode pattern was printed were further stacked respectively on the upper surface and on the lower surface of the resultant stack of the 360 ceramic green sheets. The entire resultant stack was laminated with a pressing machine under conditions of a temperature of 60° C., a pressure of $10^7$ Pa, and a time for 10 minutes and cut into a certain size. Thus, capacitor compact bodies were obtained.

The capacitor compact bodies were then degreased in the atmosphere in the temperature range of up to 500° C. and subsequently fired in hydrogen-nitrogen at 1150° C. to 1200° C. for 2 hours (hereinafter, referred to as reduction firing) to produce capacitor bodies. In this case, the firing temperature was 1150° C. for Sample Nos. 11 to 13 and 18 and 1200° C. for the other Sample Nos.

The thus-fired samples were subsequently cooled and then subjected to a reoxidation treatment in a nitrogen atmosphere at 1000° C. for 4 hours. These capacitor bodies had dimensions of 0.95×0.48×0.48 $mm^3$ and dielectric layers had a thickness of 2 μm. The area of the internal electrode layers was 0.3 $mm^2$.

The capacitor bodies obtained by the firing were then subjected to barrel polishing. After that, an external electrode paste containing a Cu powder and glass was applied to the both ends of the capacitor bodies and baked at 850° C. to form external electrodes. Ni and subsequently Sn were plated on the surfaces of the external electrodes with an electrolysis barrel apparatus. Thus, multilayer ceramic capacitors were produced.

The multilayer ceramic capacitors including the capacitor bodies obtained by the reoxidation treatment were again subjected to a heat treatment in hydrogen-nitrogen at 1150° C. for 2 hours (rereduction treatment).

These multilayer ceramic capacitors were evaluated in terms of the following properties. The capacitance was determined under measurement conditions of a frequency of 1.0 kHz and a measurement voltage of 1 Vrms. The insulation resistance was evaluated in terms of samples in which the external electrodes were formed on the capacitor bodies after the reduction firing, samples in which the external electrodes were formed after the reoxidation treatment, and samples subjected to the rereduction treatment.

Samples were subjected to a high temperature loading test at a temperature of 140° C. and at a voltage of 30V and evaluated by measuring the insulation resistance of the samples after the lapse of 100 hours under these conditions. The number of the samples in each evaluation was 30.

The mean diameter of the whole crystal grains constituted by crystal grains constituting the first crystal group and crystal grains constituting the second crystal group was determined as follows. An image of a polished surface obtained by polishing a section of the dielectric layers, the image being projected in a transmission electron microscope, was input into a computer. A diagonal line was drawn on the image on the screen of the computer and the areas of crystal grains on the diagonal line were measured by subjecting the contours of the grains to image processing. The diameters of the grains were calculated as the diameters of circles having the same areas as the grains. The mean diameter was obtained as a mean value of the thus-calculated diameters of about 50 crystal grains.

The Ca concentration of the crystal grains was obtained by subjecting about 30 crystal grains present in a polished surface of dielectric layers obtained by polishing a section of a multilayer ceramic capacitor in the stacked direction to elemental analysis with a transmission electron microscope equipped with an elemental analysis device. In this case, the spot size of electron beams was 5 nm. The analysis was conducted at five points that were present from near the grain boundary to the center of each crystal grain. The crystal grains were selected in the following manner. The areas of crystal grains were measured by image processing on the basis of the contours of the grains. The diameters of the grains were calculated as the diameters of circles having the same areas as the grains. Crystal grains that had diameters within the range of ±30% from the mean crystal grain diameter were selected as the crystal grains. Crystal grains having a Ca concentration of 0.2 atomic % or less were categorized as the first crystal group and crystal grains having a Ca concentration of 0.4 atomic % or more were categorized as the second crystal group.

The mean diameter of the crystal grains constituting the first crystal group and the mean diameter of the crystal grains constituting the second crystal group were calculated from the areal data of the crystal grains constituting the first crystal group and the crystal grains constituting the second crystal group, the areal data being obtained when the Ca concentration was determined above. In this case, an image of a polished surface obtained by polishing a section of the dielectric layers, the image being projected in a transmission electron microscope, was input into a computer. The contours of the crystal grains on the screen of the computer were subjected to image processing and the areas of the crystal grains were measured. The diameters of the grains were calculated as the diameters of circles having the same areas as the grains. Each mean diameter was obtained as a mean value of the thus-calculated diameters of about 50 crystal grains.

Following this analysis, the area proportion in terms of the crystal grains constituting the first crystal group and the crystal grains constituting the second crystal group, the first crystal group and the second crystal group constituting the dielectric layers, was calculated from the areal data obtained in the above-described determination of each mean diameter of about 50 crystal grains. This area proportion is represented by b/(a+b) wherein a represents the area of crystal grains 1a constituting the first crystal group and b represents the area of crystal grains 1b constituting the second crystal group. In this case, crystal grains having a Ca concentration of more than 0.4 atomic % (rounding off the number to the first decimal place) were categorized as the crystal grains of the second crystal group. As shown in Tables 1 to 4, samples in which the BT powder and the BCT powder were mixed had increased proportions of crystal grains having a Ca concentration of 0.4 atomic % or more after firing due to diffusion of Ca during the firing in comparison with the mixing proportions of the BT powder and the BCT powder. These samples contained both crystal grains having a Ca concentration of 0.2 atomic % or less and crystal grains having a Ca concentration of 0.4 atomic % or more.

The ratios of the concentrations of magnesium and a rare-earth element were measured with a transmission electron microscope equipped with an elemental analysis device (EDS). In this case, a sample to be analyzed was obtained by polishing a multilayer ceramic capacitor in the stacked direction and selecting the crystal grains of the first crystal group and the crystal grains of the second crystal group on the polished surface of the dielectric layers in accordance with the determination based on the measurement of the Ca concentration described above. These crystal grains were selected in the following manner. The areas of crystal grains were measured by image processing on the basis of the contours of the grains. The diameters of the grains were calculated as the diameters of circles having the same areas as the grains. Crystal grains that had diameters within the range of ±30% from the mean crystal grain diameter were selected as the crystal grains. Ten crystal grains in this range were respectively selected in terms of the crystal grains of the first crystal group and the crystal grains of the second crystal group.

In this analysis, the spot size of electron beams in elemental analysis was 1 to 3 nm. The analysis was conducted for the surface layer and the center portion of a crystal grain. The surface layer of a crystal grain was defined as a region within 3 nm from the grain boundary of the crystal grain. was defined as a region within a circle having its center at the center of the inscribed circle of the crystal grain and having a radius of ⅓ of the radius of the inscribed circle. In this case, the inscribed circle of a crystal grain was drawn on an image projected in a transmission electron microscope on the screen of a computer. On the basis of the image on the screen, the center portion of the crystal grain was determined.

The concentrations of magnesium and a rare-earth element of each crystal grain was determined in the center portion of the crystal grain shown in a micrograph taken with a transmission electron microscope and in the surface layer of the crystal grain, the center portion being within the inscribed circle of the crystal grain. In this case, the ratios of the concentrations of magnesium and a rare-earth element were determined by the above-described method.

On the basis of the thus-determined concentrations of magnesium and the rare-earth element in each crystal grain, the concentration ratios of magnesium and the rare-earth element in the surface layer and the center portion of each crystal grain were obtained. The average value of the thus-obtained concentration ratios of 10 crystal grains was determined.

The compositions of the thus-obtained samples, which were sintered bodies, were analyzed by ICP analysis or atomic absorption spectroscopy. Specifically, a mixture of each resultant dielectric ceramic, boric acid and sodium carbonate was melted and dissolved in hydrochloric acid, and the resultant solution was qualitatively analyzed by atomic absorption spectroscopy for elements contained in the dielectric ceramic. Then, the identified elements were quantified by ICP emission spectroscopy with standard samples obtained by diluting standard solutions of the elements. The amounts of oxygen were measured with the assumption that the elements had valences shown in the periodic table. The mixing compositions are shown in Table 1. The compositions of each element in the sinters in terms of oxides are shown in Table 2. The results of the characteristics are shown in Tables 3 and 4. In the following Tables, for example, "1.0E+05" refers to $1.0 \times 10^5$.

TABLE 1

| | Sample No. | BT powder Mol | BCT powder Mol | MgO Molar part | Oxide of rare-earth element ($RE_2O_3$) Type | Molar part | $MnCO_3$ Molar part | $V_2O_5$ Molar part |
|---|---|---|---|---|---|---|---|---|
| * | I-1 | 50 | 50 | 0.7 | $Y_2O_3$ | 0.7 | 0.2 | 0 |
| | I-2 | 50 | 50 | 0.7 | $Y_2O_3$ | 0.7 | 0.2 | 0.05 |
| | I-3 | 50 | 50 | 0.7 | $Y_2O_3$ | 0.7 | 0.2 | 0.1 |

TABLE 1-continued

| Sample No. | BT powder Mol | BCT powder Mol | MgO Molar part | Oxide of rare-earth element (RE$_2$O$_3$) Type | Molar part | MnCO$_3$ Molar part | V$_2$O$_5$ Molar part |
|---|---|---|---|---|---|---|---|
| I-4 | 50 | 50 | 0.7 | Y$_2$O$_3$ | 0.7 | 0.2 | 0.15 |
| I-5 | 50 | 50 | 0.7 | Y$_2$O$_3$ | 0.7 | 0.2 | 0.2 |
| I-6 | 50 | 50 | 0.7 | Y$_2$O$_3$ | 0.7 | 0.2 | 0.3 |
| I-7 | 50 | 50 | 0.7 | Y$_2$O$_3$ | 0.7 | 0.2 | 0.4 |
| I-8 | 50 | 50 | 0.7 | Y$_2$O$_3$ | 0.7 | 0.2 | 0.5 |
| * I-9 | 100 | 0 | 0.7 | Y$_2$O$_3$ | 0.7 | 0.2 | 0.15 |
| * I-10 | 0 | 100 | 0.7 | Y$_2$O$_3$ | 0.7 | 0.2 | 0.15 |
| I-11 | 50 | 50 | 0.5 | Y$_2$O$_3$ | 0.5 | 0.2 | 0.15 |
| I-12 | 50 | 50 | 0.3 | Y$_2$O$_3$ | 0.3 | 0.2 | 0.15 |
| I-13 | 50 | 50 | 0.3 | Y$_2$O$_3$ | 0.7 | 0.2 | 0.15 |
| I-14 | 50 | 50 | 1 | Y$_2$O$_3$ | 0.7 | 0.2 | 0.15 |
| I-15 | 50 | 50 | 1.5 | Y$_2$O$_3$ | 0.7 | 0.2 | 0.15 |
| I-16 | 50 | 50 | 0.7 | Y$_2$O$_3$ | 1 | 0.2 | 0.15 |
| I-17 | 50 | 50 | 0.7 | Y$_2$O$_3$ | 1.5 | 0.2 | 0.15 |
| I-18 | 50 | 50 | 0.7 | Y$_2$O$_3$ | 0.3 | 0.2 | 0.15 |
| I-19 | 50 | 50 | 0.7 | Y$_2$O$_3$ | 0.7 | 0.07 | 0.15 |
| I-20 | 50 | 50 | 0.7 | Y$_2$O$_3$ | 0.7 | 0.1 | 0.15 |
| I-21 | 50 | 50 | 0.7 | Y$_2$O$_3$ | 0.7 | 0.3 | 0.15 |
| I-22 | 50 | 50 | 0.7 | Y$_2$O$_3$ | 0.7 | 0.4 | 0.15 |
| I-23 | 50 | 50 | 0.7 | Y$_2$O$_3$ | 0.7 | 0.2 | 0.05 |
| * I-24 | 80 | 20 | 0.7 | Y$_2$O$_3$ | 0.7 | 0.2 | 0.2 |
| I-25 | 70 | 30 | 0.7 | Y$_2$O$_3$ | 0.7 | 0.2 | 0.2 |
| I-26 | 40 | 60 | 0.7 | Y$_2$O$_3$ | 0.7 | 0.2 | 0.2 |
| * I-27 | 30 | 70 | 0.7 | Y$_2$O$_3$ | 0.7 | 0.2 | 0.2 |
| I-28 | 50 | 50 | 0.7 | Dy$_2$O$_3$ | 0.7 | 0.2 | 0.2 |
| I-29 | 50 | 50 | 0.7 | Ho$_2$O$_3$ | 0.7 | 0.2 | 0.2 |
| I-30 | 50 | 50 | 0.7 | Er$_2$O$_3$ | 0.7 | 0.2 | 0.2 |

* Asterisked samples do not fall within the scope of the present invention.

TABLE 2

| Sample No. | b/(a + b) ** | MgO Molar part | Oxide of rare-earth element RE$_2$O$_3$ Type | Molar part | MnO Molar part | V$_2$O$_5$ Molar part |
|---|---|---|---|---|---|---|
| * 1-1 | 0.7 | 0.7 | Y$_2$O$_3$ | 0.7 | 0.2 | 0 |
| I-2 | 0.7 | 0.7 | Y$_2$O$_3$ | 0.7 | 0.2 | 0.05 |
| I-3 | 0.7 | 0.7 | Y$_2$O$_3$ | 0.7 | 0.2 | 0.1 |
| I-4 | 0.7 | 0.7 | Y$_2$O$_3$ | 0.7 | 0.2 | 0.15 |
| I-5 | 0.7 | 0.7 | Y$_2$O$_3$ | 0.7 | 0.2 | 0.2 |
| I-6 | 0.7 | 0.7 | Y$_2$O$_3$ | 0.7 | 0.2 | 0.3 |
| I-7 | 0.7 | 0.7 | Y$_2$O$_3$ | 0.7 | 0.2 | 0.4 |
| I-8 | 0.7 | 0.7 | Y$_2$O$_3$ | 0.7 | 0.2 | 0.5 |
| * I-9 | 0.7 | 0.7 | Y$_2$O$_3$ | 0.7 | 0.2 | 0.15 |
| * I-10 | 0.7 | 0.7 | Y$_2$O$_3$ | 0.7 | 0.2 | 0.15 |
| I-11 | 0.7 | 0.5 | Y$_2$O$_3$ | 0.5 | 0.2 | 0.15 |
| I-12 | 0.7 | 0.3 | Y$_2$O$_3$ | 0.3 | 0.2 | 0.15 |
| I-13 | 0.7 | 0.3 | Y$_2$O$_3$ | 0.7 | 0.2 | 0.15 |
| I-14 | 0.7 | 1 | Y$_2$O$_3$ | 0.7 | 0.2 | 0.15 |
| I-15 | 0.7 | 1.5 | Y$_2$O$_3$ | 0.7 | 0.2 | 0.15 |
| I-16 | 0.7 | 0.7 | Y$_2$O$_3$ | 1 | 0.2 | 0.15 |
| I-17 | 0.7 | 0.7 | Y$_2$O$_3$ | 1.5 | 0.2 | 0.15 |
| I-18 | 0.7 | 0.7 | Y$_2$O$_3$ | 0.3 | 0.2 | 0.15 |
| I-19 | 0.7 | 0.7 | Y$_2$O$_3$ | 0.7 | 0.07 | 0.15 |
| I-20 | 0.7 | 0.7 | Y$_2$O$_3$ | 0.7 | 0.1 | 0.15 |
| I-21 | 0.7 | 0.7 | Y$_2$O$_3$ | 0.7 | 0.3 | 0.15 |
| I-22 | 0.7 | 0.7 | Y$_2$O$_3$ | 0.7 | 0.4 | 0.15 |
| I-23 | 0.7 | 0.7 | Y$_2$O$_3$ | 0.7 | 0.2 | 0.05 |
| * I-24 | 0.4 | 0.7 | Y$_2$O$_3$ | 0.7 | 0.2 | 0.2 |
| I-25 | 0.5 | 0.7 | Y$_2$O$_3$ | 0.7 | 0.2 | 0.2 |
| I-26 | 0.8 | 0.7 | Y$_2$O$_3$ | 0.7 | 0.2 | 0.2 |
| * I-27 | 0.9 | 0.7 | Y$_2$O$_3$ | 0.7 | 0.2 | 0.2 |
| I-28 | 0.7 | 0.7 | Dy$_2$O$_3$ | 0.7 | 0.2 | 0.2 |
| I-29 | 0.7 | 0.7 | Ho$_2$O$_3$ | 0.7 | 0.2 | 0.2 |
| I-30 | 0.7 | 0.7 | Er$_2$O$_3$ | 0.7 | 0.2 | 0.2 |

* Asterisked samples do not fall within the scope of the present invention.
** Area ratio where a represents the area of the crystal grains constituting the first crystal group and b represents the area of the crystal grains constituting the second crystal group

TABLE 3

| Sample No. | Crystal grains of the first crystal group | | | Crystal grains of the second crystal group | | |
|---|---|---|---|---|---|---|
| | Concentration ratios of additives in center portion to surface layer of crystal grain | | Mean grain diameter μm | Concentration ratios of additives in center portion to surface layer of crystal grain | | Mean grain diameter μm |
| | Mg | Y | | Mg | Y | |
| * I-1 | 0.8 | 0.37 | 0.12 | 0.09 | 0.37 | 0.14 |
| I-2 | 0.85 | 0.39 | 0.17 | 0.10 | 0.38 | 0.15 |

TABLE 3-continued

| | Crystal grains of the first crystal group | | | Crystal grains of the second crystal group | | |
|---|---|---|---|---|---|---|
| | Concentration ratios of additives in center portion to surface layer of crystal grain | | Mean grain | Concentration ratios of additives in center portion to surface layer of crystal grain | | Mean grain |
| Sample No. | Mg — | Y — | diameter μm | Mg — | Y — | diameter μm |
| I-3 | 0.86 | 0.4 | 0.21 | 0.10 | 0.37 | 0.15 |
| I-4 | 0.87 | 0.41 | 0.23 | 0.11 | 0.38 | 0.15 |
| I-5 | 0.88 | 0.43 | 0.25 | 0.11 | 0.39 | 0.15 |
| I-6 | 0.89 | 0.43 | 0.3 | 0.11 | 0.39 | 0.15 |
| I-7 | 0.91 | 0.44 | 0.35 | 0.11 | 0.39 | 0.15 |
| I-8 | 0.92 | 0.45 | 0.41 | 0.12 | 0.40 | 0.16 |
| * I-9 | 0.93 | 0.51 | 0.47 | — | — | — |
| * I-10 | — | — | — | 0.11 | 0.40 | 0.15 |
| I-11 | 0.87 | 0.41 | 0.26 | 0.11 | 0.38 | 0.15 |
| I-12 | 0.83 | 0.38 | 0.35 | 0.11 | 0.36 | 0.19 |
| I-13 | 0.84 | 0.42 | 0.33 | 0.10 | 0.38 | 0.17 |
| I-14 | 0.92 | 0.4 | 0.27 | 0.13 | 0.38 | 0.16 |
| I-15 | 0.92 | 0.4 | 0.26 | 0.13 | 0.38 | 0.16 |
| I-16 | 0.92 | 0.4 | 0.27 | 0.13 | 0.38 | 0.16 |
| I-17 | 0.92 | 0.4 | 0.26 | 0.13 | 0.38 | 0.16 |
| I-18 | 0.88 | 0.4 | 0.34 | 0.11 | 0.39 | 0.18 |
| I-19 | 0.88 | 0.43 | 0.35 | 0.11 | 0.39 | 0.18 |
| I-20 | 0.88 | 0.43 | 0.3 | 0.11 | 0.39 | 0.17 |
| I-21 | 0.93 | 0.44 | 0.25 | 0.11 | 0.38 | 0.15 |
| I-22 | 0.93 | 0.45 | 0.26 | 0.11 | 0.39 | 0.15 |
| I-23 | 0.85 | 0.39 | 0.15 | 0.10 | 0.38 | 0.17 |
| * I-24 | 0.88 | 0.43 | 0.25 | 0.11 | 0.39 | 0.15 |
| I-25 | 0.88 | 0.43 | 0.25 | 0.11 | 0.39 | 0.15 |
| I-26 | 0.88 | 0.43 | 0.25 | 0.11 | 0.39 | 0.15 |
| * I-27 | 0.88 | 0.43 | 0.25 | 0.11 | 0.39 | 0.15 |
| I-28 | 0.88 | 0.43 | 0.25 | 0.11 | 0.39 | 0.15 |
| I-29 | 0.88 | 0.43 | 0.25 | 0.11 | 0.39 | 0.15 |
| I-30 | 0.88 | 0.43 | 0.25 | 0.11 | 0.39 | 0.15 |

* Asterisked samples do not fall within the scope of the present invention.

TABLE 4

| | After reduction firing | | After reoxidation treatment | | | After rereduction treatment | |
|---|---|---|---|---|---|---|---|
| Sample No. | IR (insulation resistance) Applied voltage 25 V Temperature: 25° C. Ω | Capacitance μF | IR (insulation resistance) Applied voltage 25 V Temperature: 25° C. Ω | Capacitance μF | Insulation resistance after the lapse of 100 hours in high temperature loading test Ω | IR (insulation resistance) Applied voltage 25 V Temperature: 25° C. Ω | Capacitance μF |
| * I-1 | Not measurable | 0.41 | 1.0E+10 | 0.47 | 1.0E+05 | Not measurable | 0.41 |
| I-2 | 1.0E+10 | 0.47 | 1.0E+10 | 0.47 | 1.0E+06 | 1.0E+10 | 0.47 |
| I-3 | 1.0E+09 | 0.47 | 1.0E+09 | 0.47 | 1.0E+07 | 1.0E+09 | 0.47 |
| I-4 | 1.0E+09 | 0.47 | 1.0E+09 | 0.47 | 2.0E+07 | 1.0E+09 | 0.47 |
| I-5 | 1.0E+09 | 0.471 | 1.0E+09 | 0.471 | 2.0E+07 | 1.0E+09 | 0.471 |
| I-6 | 1.0E+09 | 0.472 | 1.0E+09 | 0.472 | 2.0E+07 | 1.0E+09 | 0.472 |
| I-7 | 1.0E+08 | 0.472 | 1.0E+08 | 0.472 | 2.0E+07 | 1.0E+08 | 0.472 |
| I-8 | 1.0E+07 | 0.47 | 1.0E+07 | 0.47 | 1.0E+06 | 1.0E+07 | 0.47 |
| * I-9 | Not measurable | 0.47 | 1.0E+10 | 0.47 | 1.0E+05 | Not measurable | 0.47 |
| * I-10 | Not measurable | 0.47 | 1.0E+10 | 0.47 | 1.0E+05 | Not measurable | 0.47 |
| I-11 | 1.0E+09 | 0.472 | 1.0E+09 | 0.47 | 2.0E+07 | 1.0E+09 | 0.471 |
| I-12 | 1.0E+09 | 0.473 | 1.0E+09 | 0.47 | 9.0E+06 | 1.0E+09 | 0.472 |
| I-13 | 1.0E+09 | 0.471 | 1.0E+09 | 0.47 | 9.0E+06 | 1.0E+09 | 0.471 |
| I-14 | 1.0E+09 | 0.47 | 1.0E+09 | 0.47 | 1.0E+07 | 1.0E+09 | 0.47 |
| I-15 | 1.0E+09 | 0.45 | 1.0E+09 | 0.45 | 1.0E+07 | 1.0E+09 | 0.45 |
| I-16 | 1.0E+09 | 0.47 | 1.0E+09 | 0.47 | 1.0E+07 | 1.0E+09 | 0.47 |
| I-17 | 1.0E+09 | 0.455 | 1.0E+09 | 0.455 | 1.0E+07 | 1.0E+09 | 0.455 |
| I-18 | 1.0E+09 | 0.47 | 1.0E+09 | 0.47 | 9.0E+06 | 1.0E+09 | 0.47 |
| I-19 | 7.0E+08 | 0.465 | 9.0E+08 | 0.47 | 8.0E+06 | 7.0E+08 | 0.465 |
| I-20 | 1.0E+09 | 0.47 | 1.0E+09 | 0.47 | 1.0E+07 | 1.0E+09 | 0.47 |
| I-21 | 1.0E+09 | 0.47 | 1.0E+09 | 0.47 | 1.0E+07 | 1.0E+09 | 0.47 |
| I-22 | 1.0E+09 | 0.45 | 1.0E+09 | 0.45 | 1.0E+07 | 1.0E+09 | 0.45 |
| I-23 | 9.0E+09 | 0.47 | 9.0E+09 | 0.47 | 8.0E+05 | 8.0E+09 | 0.47 |
| * I-24 | 1.0E+06 | 0.46 | 1.0E+08 | 0.46 | 4.0E+05 | 1.0E+06 | 0.46 |
| I-25 | 1.0E+08 | 0.471 | 1.0E+09 | 0.471 | 1.0E+07 | 1.0E+07 | 0.46 |

TABLE 4-continued

| | After reduction firing | | After reoxidation treatment | | | After rereduction treatment | |
|---|---|---|---|---|---|---|---|
| Sample No. | IR (insulation resistance) Applied voltage 25 V Temperature: 25° C. Ω | Capacitance μF | IR (insulation resistance) Applied voltage 25 V Temperature: 25° C. Ω | Capacitance μF | Insulation resistance after the lapse of 100 hours in high temperature loading test Ω | IR (insulation resistance) Applied voltage 25 V Temperature: 25° C. Ω | Capacitance μF |
| I-26 | 1.0E+09 | 0.471 | 1.0E+09 | 0.471 | 2.0E+07 | 1.0E+08 | 0.471 |
| * I-27 | 7.0E+06 | 0.4 | 1.0E+09 | 0.4 | 2.0E+07 | 7.0E+06 | 0.4 |
| I-28 | 9.9E+08 | 0.47 | 9.9E+08 | 0.47 | 1.9E+07 | 9.9E+08 | 0.47 |
| I-29 | 9.9E+08 | 0.47 | 9.9E+08 | 0.47 | 1.9E+07 | 9.9E+08 | 0.47 |
| I-30 | 9.9E+08 | 0.47 | 9.9E+08 | 0.47 | 1.9E+07 | 9.9E+08 | 0.47 |

* Asterisked samples do not fall within the scope of the present invention.

As is obvious from the results in Tables 1 to 4, the samples satisfying the following conditions had an insulation resistance of $10^7$ Ω or more even after subjected to the reduction firing and also had an insulation resistance of $8 \times 10^5$ Ω or more after the lapse of 100 hours in the high temperature loading test, which was a high insulation property. These samples also had an insulation resistance of $10^7$ Ω or more even after subjected to the rereduction treatment. The conditions were that the ratio b/(a+b) was 0.5 to 0.8 where a represents the area proportion of the crystal grains of the first crystal group and b represents the proportion of the crystal grains of the second crystal group in dielectric layers, and the ratios of the concentrations of magnesium and the rare-earth elements contained in the center portions of the crystal grains 9a constituting the first crystal group to the concentrations of magnesium and the rare-earth elements in the surface layers of the crystal grains 9a constituting the first crystal group were respectively larger than the ratios of the concentrations of magnesium and the rare-earth elements contained in the center portions of the crystal grains 9b constituting the second crystal group to the concentrations of magnesium and the rare-earth elements in the surface layers of the crystal grains 9b constituting the second crystal group.

In particular, Sample Nos. 2 to 8, 11 to 22, 25, 26, and 28 to 30 in which the mean diameter of the crystal grains of the first crystal group was made larger than the mean diameter of the crystal grains of the second crystal group had an insulation resistance of $10^6$ Ω or more after subjected to the high temperature loading test.

In Sample Nos. 3 to 7, 11, 14, 16, 20, 21, 25, 26, 28 to 30 in which the dielectric layers contained 0.5 to mole of magnesium, 0.5 to 1 mole of the rare-earth elements, 0.1 to 0.3 moles of manganese, and 0.1 to 0.4 moles of vanadium, based on 100 moles of titanium constituting the barium titanate, the dielectric layers had an insulation resistance of $1 \times 10^7$ Ω or more after the lapse of 100 hours in the high temperature loading test or had a capacitance of 0.47 μF or more.

In contrast, the insulation resistance after the firing was not measurable in samples (Sample Nos. 9 and 10) in which the dielectric layers were not constituted by the two types of crystal grains of the first crystal group and the second crystal group and in Sample No. 1 in which $V_2O_5$ was not added and the content ratios of the rare-earth element in the two types of crystal grains of the first crystal group and the second crystal group were the same. When the ratio b/(a+b) was less than 0.5 (Sample No. 24) and the ratio b/(a+b) was more than 0.8 (Sample No. 27), the insulation resistance after the reduction firing and the rereduction treatment was less than $10^7$ Ω.

Example II

The following material powders were prepared and mixed in accordance with the proportions shown in Table 5: a BT powder, a BCT powder ($Ba_{0.95}Ca_{0.05}TiO_3$), MgO, $Y_2O_3$, $MnCO_3$, $V_2O_5$, and $ZrO_2$. The amounts of MgO, $Y_2O_3$, $MnCO_3$, $V_2O_5$, and $ZrO_2$ added were based on 100 molar parts of the barium titanate component extracted from the total amount of the BT powder and the BCT powder.

These material powders had a purity of 99.9%. The BT powder and the BCT powder had a mean particle diameter of 100 nm for all the samples in Table 5. The Ba/Ti ratio of the BT powder was 1.001 and the Ba/Ti ratio of the BCT powder was 1.003. MgO, $Y_2O_3$, $MnCO_3$, $V_2O_5$, and $ZrO_2$ had a mean particle diameter of 0.2 μm.

Sample No. II-25 was a case in which only the BCT powder was used as the dielectric powder. Sample No. II-26 was a case in which the BT powder was used as the dielectric powder. Sample No. II-27 was an example in which $Dy_2O_3$ was used as the rare-earth element.

A glass powder having a composition of $SiO_2$=55, BaO=20, CaO=15, and $Li_2O$=10 (mole %) was used as a sintering auxiliary. The amount of the glass powder added was 1 part by mass based on 100 parts by mass of the BT powder and the BCT powder.

Then, a mixed solvent of toluene and alcohol was then added to these material powders and the resultant mixture was wet blended with zirconia balls.

Then, a polyvinyl butyral resin and a mixed solvent of toluene and alcohol were added to the thus-wet-blended powder and the resultant mixture was wet blended with zirconia balls to prepare a ceramic slurry. Ceramic green sheets having a thickness of 3 μm were produced with the ceramic slurry by a doctor blade method.

Then, a plurality of rectangular internal electrode patterns containing Ni as the main component were formed on the upper surfaces of the ceramic green sheets. A conductor paste used for forming the internal electrode patterns contained a Ni powder having a mean particle diameter of 0.3 μm. The conductor paste also contained 30 parts by mass of the BT powder used for the green sheets based on 100 parts by mass of the Ni powder.

Then, 360 ceramic green sheets on which the internal electrode patterns were printed were stacked and 20 ceramic green sheets on which no internal electrode pattern was printed were further stacked respectively on the upper surface and on the lower surface of the resultant stack of the 360 ceramic green sheets. The entire resultant stack was laminated with a pressing machine under conditions of a temperature of 60° C., a pressure of $10^7$ Pa, and a time for 10 minutes and cut into a certain size.

The resultant capacitor compact bodies were subjected to a debinding treatment at a heating rate of 10° C./h in the atmosphere at 300° C./h. The capacitor compact bodies were fired at a heating rate of 300° C./h from 500° C. in hydrogen-nitrogen at 1170° C. for 2 hours.

The resultant samples were subsequently cooled to 1000° C. at a cooling rate of 300° C./h, subjected to a reoxidation treatment in a nitrogen atmosphere at 1000° C. for 4 hours, and cooled at a cooling rate of 300° C./h. Thus, capacitor bodies were produced. These capacitor bodies had dimensions of 0.95 mm×0.48 mm×0.48 mm and dielectric layers had a thickness of 2 μm. The effective area of the internal electrode layers was 0.75 mm×0.36 mm.

Then, the capacitor bodies obtained by the firing were then subjected to barrel polishing. After that, an external electrode paste containing a Cu powder and glass was applied to the both ends of the capacitor bodies and baked at 850° C. to form external electrodes. Ni and subsequently Sn were plated on the surfaces of the external electrodes with an electrolysis barrel apparatus. Thus, multilayer ceramic capacitors were produced.

Then, these multilayer ceramic capacitors were evaluated in terms of the following properties. The capacitance was determined under measurement conditions of a frequency of 1.0 kHz and a measurement voltage of 1 Vrms.

The temperature dependent variation of a relative dielectric constant was determined as follows. The temperature dependent variation of capacitance was determined at 25° C. and 125° C. in advance and the capacitance at 125° C. was determined on the basis of the capacitance at 25° C. with the thickness of the dielectric layers, the number of the dielectric layers stacked, and the effective area of the internal electrode layers.

Insulation resistance was evaluated for samples in which Cu external electrodes were formed on the fired capacitor bodies in a nitrogen atmosphere at 800° C., and samples in which external electrodes were formed in the same manner after the reoxidation treatment. The measurement conditions for the insulation resistance were an applied voltage of 25 V and a temperature of 25° C.

Evaluation with a high temperature loading test was conducted in the same manner and under the same conditions as in EXAMPLE I. The number of samples was 30.

The mean diameters of the BT crystal grains and the BCT crystal grains constituting the dielectric layers were determined with a scanning electron microscope (SEM). A polished surface of the dielectric layers was etched and crystal grains on the polished surface were observed with a scanning electron microscope and micrographs of the crystal grains were taken. Then, 20 crystal grains in the micrographs were arbitrarily selected. The maximum diameters of these crystal grains were determined by an intercept method and the average value and $D_{90}$ (90% cumulative value from small diameters to large diameters) of the resultant maximum diameters were determined.

Analysis of Ca concentration was conducted in arbitrary points in the vicinity of the center portions of crystal grains with a transmission electron microscope and an analysis device attached to the microscope. In this analysis, crystal grains having a Ca concentration of more than 0.4 atomic % (rounding off the number to the first decimal place) were categorized as dielectric grains having high Ca concentration. This analysis was conducted for 100 crystal grains. The state of the material powders was maintained in the samples used in working examples.

The contents of Mg and the rare-earth elements in crystal grains were also analyzed with a transmission electron microscope and an analysis device attached to the microscope. In this analysis, the contents of Mg and the rare-earth elements in crystal grains were determined by subjecting selected crystal grains to elemental analysis from the surfaces to the inside of the crystal grains at an interval of 5 nm with EDX to determine the distribution of the contents of Mg and the rare-earth elements. In this case, the contents of the elements in the surfaces and in the center portions of the crystal grains were measured and the ratios of the contents were determined. Crystal grains having an aspect ratio of 1.3 or less were selected and the center portion of each crystal grain was defined as an area in the vicinity of the point of intersection of the longest diameter and the shortest diameter of the crystal grain. The results are shown in Table 5.

TABLE 5

| | | Rare-earth element | | MnO | $V_2O_5$ | $ZrO_2$ | BCT crystal grains | | | BT crystal grains | | |
|---|---|---|---|---|---|---|---|---|---|---|---|---|
| | MgO | | | | | | Content ratio of added components in center portion to surface of crystal grain | | Mean grain | Content ratio of added components in center portion to surface of crystal grain | | Mean grain |
| Sample No. | Molar part | Type | Molar part | Molar part | Molar part | Molar part | Mg — | Y — | diameter μm | Mg — | Y — | diameter μm |
| * II-1 | 0.7 | $Y_2O_3$ | 0.7 | 0.2 | 0.15 | 0 | 0.11 | 0.38 | 0.15 | 0.87 | 0.41 | 0.23 |
| II-2 | 0.7 | $Y_2O_3$ | 0.7 | 0.2 | 0.15 | 0.1 | 0.11 | 0.38 | 0.15 | 0.87 | 0.41 | 0.23 |
| II-3 | 0.7 | $Y_2O_3$ | 0.7 | 0.2 | 0.15 | 0.2 | 0.11 | 0.38 | 0.15 | 0.87 | 0.41 | 0.23 |
| II-4 | 0.7 | $Y_2O_3$ | 0.7 | 0.2 | 0.15 | 0.3 | 0.11 | 0.37 | 0.15 | 0.87 | 0.41 | 0.23 |
| * II-5 | 0.7 | $Y_2O_3$ | 0.7 | 0.2 | 0 | 0.3 | 0.09 | 0.37 | 0.14 | 0.81 | 0.37 | 0.13 |
| II-6 | 0.7 | $Y_2O_3$ | 0.7 | 0.2 | 0.05 | 0.3 | 0.11 | 0.37 | 0.15 | 0.87 | 0.41 | 0.23 |
| II-7 | 0.7 | $Y_2O_3$ | 0.7 | 0.2 | 0.1 | 0.3 | 0.11 | 0.37 | 0.15 | 0.87 | 0.41 | 0.23 |
| II-8 | 0.7 | $Y_2O_3$ | 0.7 | 0.2 | 0.3 | 0.3 | 0.11 | 0.37 | 0.15 | 0.87 | 0.41 | 0.23 |
| II-9 | 0.7 | $Y_2O_3$ | 0.7 | 0.2 | 0.5 | 0.3 | 0.11 | 0.37 | 0.15 | 0.87 | 0.41 | 0.23 |
| II-10 | 0.7 | $Y_2O_3$ | 0.7 | 0.2 | 0.15 | 0.6 | 0.11 | 0.37 | 0.16 | 0.86 | 0.4 | 0.24 |
| II-11 | 0.7 | $Y_2O_3$ | 0.7 | 0.2 | 0.15 | 1 | 0.11 | 0.36 | 0.16 | 0.86 | 0.4 | 0.24 |
| II-12 | 0.7 | $Y_2O_3$ | 0.7 | 0.2 | 0.15 | 1.2 | 0.09 | 0.35 | 0.18 | 0.84 | 0.38 | 0.26 |
| II-13 | 0.4 | $Y_2O_3$ | 0.7 | 0.2 | 0.15 | 0.3 | 0.11 | 0.37 | 0.15 | 0.87 | 0.41 | 0.23 |
| II-14 | 0.5 | $Y_2O_3$ | 0.7 | 0.2 | 0.15 | 0.3 | 0.11 | 0.37 | 0.15 | 0.87 | 0.41 | 0.23 |
| II-15 | 1 | $Y_2O_3$ | 0.7 | 0.2 | 0.15 | 0.3 | 0.11 | 0.37 | 0.15 | 0.87 | 0.41 | 0.23 |
| II-16 | 1.2 | $Y_2O_3$ | 0.7 | 0.2 | 0.15 | 0.3 | 0.11 | 0.37 | 0.15 | 0.87 | 0.41 | 0.23 |
| II-17 | 0.7 | $Y_2O_3$ | 0.4 | 0.2 | 0.15 | 0.3 | 0.11 | 0.37 | 0.15 | 0.87 | 0.41 | 0.23 |
| II-18 | 0.7 | $Y_2O_3$ | 0.5 | 0.2 | 0.15 | 0.3 | 0.11 | 0.37 | 0.15 | 0.87 | 0.41 | 0.23 |
| II-19 | 0.7 | $Y_2O_3$ | 1 | 0.2 | 0.15 | 0.3 | 0.11 | 0.37 | 0.15 | 0.87 | 0.41 | 0.23 |

TABLE 5-continued

| | Sample No. | | | | | | | | | | |
|---|---|---|---|---|---|---|---|---|---|---|---|
| | II-20 | 0.7 | $Y_2O_3$ | 1.2 | 0.2 | 0.15 | 0.3 | 0.11 | 0.37 | 0.15 | 0.87 | 0.41 | 0.23 |
| | II-21 | 0.7 | $Y_2O_3$ | 0.7 | 0.05 | 0.15 | 0.3 | 0.11 | 0.37 | 0.15 | 0.87 | 0.41 | 0.23 |
| | II-22 | 0.7 | $Y_2O_3$ | 0.7 | 0.1 | 0.15 | 0.3 | 0.11 | 0.37 | 0.15 | 0.87 | 0.41 | 0.23 |
| | II-23 | 0.7 | $Y_2O_3$ | 0.7 | 0.3 | 0.15 | 0.3 | 0.11 | 0.37 | 0.15 | 0.87 | 0.41 | 0.23 |
| | II-24 | 0.7 | $Y_2O_3$ | 0.7 | 0.4 | 0.15 | 0.3 | 0.11 | 0.37 | 0.15 | 0.87 | 0.41 | 0.23 |
| * | II-25 | 0.7 | $Y_2O_3$ | 0.7 | 0.2 | 0.15 | 0.3 | — | — | — | 0.93 | 0.51 | 0.45 |
| * | II-26 | 0.7 | $Y_2O_3$ | 0.7 | 0.2 | 0.15 | 0.3 | 0.11 | 0.40 | 0.45 | — | — | — |
| | II-27 | 0.7 | $Dy_2O_3$ | 0.7 | 0.2 | 0.3 | 0.3 | 0.11 | 0.37 | 0.15 | 0.87 | 0.41 | 0.23 |

| | | After firing | | After reoxidation treatment | | | |
|---|---|---|---|---|---|---|---|
| | Sample No. | Insulation resistance Ω | Relative dielectric constant — | Insulation resistance Ω | Relative dielectric constant — | Insulation resistance after the lapse of 100 hours in high temperature loading test Ω | Variation of capacitance at 125° C. based on the capacitance at 25° C. % |
| * | II-1 | 1.E+09 | 3950 | 1.E+09 | 3910 | 2.E+07 | −13.3 |
| | II-2 | 1.E+09 | 4060 | 1.E+09 | 4010 | 2.E+07 | −13.6 |
| | II-3 | 1.E+09 | 4075 | 1.E+09 | 4050 | 2.E+07 | −13.8 |
| | II-4 | 1.E+09 | 4130 | 1.E+09 | 4100 | 2.E+07 | −14.1 |
| * | II-5 | Not measurable | 3800 | 1.E+09 | 3920 | 1.E+05 | −14 |
| | II-6 | 1.E+09 | 4100 | 1.E+09 | 4080 | 1.E+06 | −14.8 |
| | II-7 | 1.E+09 | 4120 | 1.E+09 | 4090 | 1.E+07 | −14.6 |
| | II-8 | 1.E+09 | 4140 | 1.E+09 | 4110 | 2.E+07 | −14.2 |
| | II-9 | 1.E+09 | 4160 | 1.E+09 | 4120 | 1.E+06 | −14 |
| | II-10 | 1.E+09 | 4180 | 1.E+09 | 4130 | 2.E+07 | −14.4 |
| | II-11 | 1.E+09 | 4200 | 1.E+09 | 4180 | 2.E+07 | −14.7 |
| | II-12 | 1.E+09 | 4250 | 1.E+09 | 4220 | 2.E+07 | −15.6 |
| | II-13 | 1.E+09 | 4140 | 1.E+09 | 4110 | 2.E+07 | −15 |
| | II-14 | 1.E+09 | 4125 | 1.E+09 | 4085 | 2.E+07 | −14.2 |
| | II-15 | 1.E+09 | 4115 | 1.E+09 | 4075 | 2.E+07 | −14.3 |
| | II-16 | 1.E+09 | 4010 | 1.E+09 | 3980 | 2.E+07 | −14.6 |
| | II-17 | 1.E+09 | 4130 | 1.E+09 | 4100 | 2.E+07 | −15 |
| | II-18 | 1.E+09 | 4120 | 1.E+09 | 4085 | 2.E+07 | −14.3 |
| | II-19 | 1.E+09 | 4110 | 1.E+09 | 4080 | 2.E+07 | −14.3 |
| | II-20 | 1.E+09 | 4020 | 1.E+09 | 3990 | 2.E+07 | −14.5 |
| | II-21 | 9.E+08 | 4130 | 1.E+09 | 4100 | 1.E+07 | −14.6 |
| | II-22 | 1.E+09 | 4120 | 1.E+09 | 4085 | 2.E+07 | −14.4 |
| | II-23 | 1.E+09 | 4110 | 1.E+09 | 4070 | 2.E+07 | −14.2 |
| | II-24 | 1.E+09 | 4030 | 1.E+09 | 3990 | 2.E+07 | −14.1 |
| * | II-25 | Not measurable | 3910 | 1.E+10 | 3870 | 1E+05 | −15 |
| * | II-26 | Not measurable | 3900 | 1.E+10 | 3960 | 1E+05 | −14 |
| | II-27 | 1.E+09 | 4100 | 1.E+09 | 4100 | 1.E+07 | −14.8 |

* Asterisked samples do not fall within the scope of the present invention.

As is obvious from the results in Table 5, the samples in which the dielectric layers were constituted by BT crystal grains and BCT crystal grains, the dielectric layers contained vanadium and zirconium, and the BT crystal grains contained Mg and the rare-earth elements in larger amounts than those in the BCT crystal grains, had an insulation resistance of $10^7$ Ω or more even after subjected to the firing and had a relative dielectric constant of 4000 or more. Thus, these samples had a high relative dielectric constant. These samples also had an insulation resistance of $1 \times 10^6$ Ω or more after the lapse of 100 hours in the high temperature loading test, which was a high insulation property. These samples also had a temperature dependent variation of capacitance within ±15.6% at 125° C., which was a small temperature dependent variation of capacitance.

In contrast, Sample No. II-1 in which $ZrO_2$ was not added had a relative dielectric constant of less than 4000 after the firing. The insulation resistance after the firing was not measurable in samples (Sample Nos. II-25 and II-26) in which the dielectric layers were not constituted by the BT crystal grains and the BCT crystal grains and in Sample No. II-5 in which $V_2O_5$ was not added.

Example III

The following material powders were prepared and mixed in accordance with the proportions shown in Table 6: a BT powder, a BCT powder ($Ba_{0.95}Ca_{0.05}TiO_3$) MgO, $Y_2O_3$, $MnCO_3$, and $V_2O_5$. The amounts of MgO, $Y_2O_3$, $MnCO_3$, and $V_2O_5$ added were based on 100 molar parts of the total amount of the BT powder and the BCT powder. These material powders had a purity of 99.9%. The BT powder and the BCT powder had a mean particle diameter of 100 nm for all the samples other than Sample No. III-14. A fine BT powder having a mean particle diameter of 50 nm was added in the proportions shown in Table 1. In Sample No. III-14, the BCT powder used had a mean particle diameter of 0.24 μm and the BT powder used had a mean particle diameter of 0.2 μm.

The Ba/Ti ratio of the BT powder was 1.001 and the Ba/Ti ratio of the BCT powder was 1.003. A glass powder having a composition of $SiO_2$=55, BaO=20, CaO=15, and $Li_2O$=10 (mole %) was used as a sintering auxiliary. The amount of the glass powder added was 1 part by mass based on 100 parts by mass of the BT powder and the BCT powder.

A mixed solvent of toluene and alcohol was then added to these material powders and the resultant mixture was wet blended with zirconia balls having a diameter of MM.

A polyvinyl butyral resin and a mixed solvent of toluene and alcohol were then added to the thus-wet-blended powder and the resultant mixture was also wet blended with zirconia balls having a diameter of 5 mm to prepare a ceramic slurry. Ceramic green sheets having a thickness of 3 μm were produced with the ceramic slurry by a doctor blade method.

Next, a plurality of rectangular internal electrode patterns containing Ni as the main component were formed on the upper surfaces of the ceramic green sheets. A conductor paste used for forming the internal electrode patterns contained a Ni powder having a mean particle diameter of 0.3 μm. The conductor paste also contained 30 parts by mass of the BT powder used for the green sheets based on 100 parts by mass of the Ni powder.

Then, 360 ceramic green sheets on which the internal electrode patterns were printed were stacked and 20 ceramic green sheets on which no internal electrode pattern was printed were further stacked respectively on the upper surface and on the lower surface of the resultant stack of the 360 ceramic green sheets. The entire resultant stack was laminated with a pressing machine under conditions of a temperature of 60° C., a pressure of $10^7$ Pa, and a time for 10 minutes and cut into a certain size.

The resultant capacitor compact bodies were subjected to a debinding treatment at a heating rate of 10° C./h in the atmosphere at 300° C./h. The capacitor compact bodies were fired at a heating rate of 300° C./h from 500° C. in hydrogen-nitrogen at 1150° C. to 1200° C. for 2 hours. The firing was conducted at 1150° C. for Sample Nos. III-1 to 13 and at 1140° C. for Sample No. III-14.

The resultant samples were subsequently cooled to 1000° C. at a cooling rate of 300° C./h, subjected to a reoxidation treatment in a nitrogen atmosphere at 1000° C. for 4 hours, and cooled at a cooling rate of 300° C./h. Thus, capacitor bodies were produced. These capacitor bodies had dimensions of 0.95×0.48'0.48 mm³ and dielectric layers had a thickness of 2 μm.

These electronic components obtained by the firing were, then, subjected to barrel polishing. After that, an external electrode paste containing a Cu powder and glass was applied to the both ends of the electronic components and baked at 850° C. to form external electrodes. Ni and subsequently Sn were then plated on the surfaces of the external electrodes with an electrolysis barrel apparatus. Thus, multilayer ceramic capacitors were produced.

These multilayer ceramic capacitors were evaluated in terms of the following properties. The capacitance was determined under measurement conditions of a frequency of 1.0 kHz and a measurement voltage of 1 Vrms. The insulation resistance was evaluated in terms of samples in which the external electrodes were formed on the capacitor bodies after the firing and samples in which the external electrodes were formed after the reoxidation treatment.

Evaluation with a high temperature loading test was conducted in the same manner and under the same conditions as in EXAMPLE I. The number of samples was 30.

The mean diameters of the BT crystal grains and the BCT crystal grains constituting the dielectric layers were determined in the same manner as in EXAMPLE II.

Analysis of Ca concentration was also conducted in the same manner as in EXAMPLE II.

The contents of Mg and the rare-earth elements in crystal grains were also analyzed in the same manner as in EXAMPLE II. The results are shown in Table 6.

TABLE 6

| Sample No. | MgO Molar part | $Y_2O_3$ Molar part | MnO Molar part | $V_2O_5$ Molar part | Amount of fine BT powder added Mass % | BCT crystal grains Content ratio of additives in center portion to surface side of crystal grain Mg | Y | Mean grain diameter μm | BT crystal grains Content ratio of additives in center portion to surface side of crystal grain Mg | Y | Mean grain diameter μm |
|---|---|---|---|---|---|---|---|---|---|---|---|
| *III-1 | 0.7 | 0.7 | 0.2 | 0 | 10 | 0.09 | 0.37 | 0.14 | 0.8 | 0.37 | 0.12 |
| III-2 | 0.7 | 0.7 | 0.2 | 0.05 | 10 | 0.10 | 0.38 | 0.15 | 0.85 | 0.39 | 0.17 |
| III-3 | 0.7 | 0.7 | 0.2 | 0.1 | 10 | 0.10 | 0.37 | 0.15 | 0.86 | 0.4 | 0.21 |
| III-4 | 0.7 | 0.7 | 0.2 | 0.15 | 10 | 0.11 | 0.38 | 0.15 | 0.87 | 0.41 | 0.23 |
| III-5 | 0.7 | 0.7 | 0.2 | 0.2 | 10 | 0.11 | 0.39 | 0.15 | 0.88 | 0.43 | 0.25 |
| III-6 | 0.7 | 0.7 | 0.2 | 0.3 | 10 | 0.11 | 0.39 | 0.15 | 0.89 | 0.43 | 0.3 |
| III-7 | 0.7 | 0.7 | 0.2 | 0.4 | 10 | 0.11 | 0.39 | 0.15 | 0.91 | 0.44 | 0.35 |
| III-8 | 0.7 | 0.7 | 0.2 | 0.5 | 10 | 0.11 | 0.39 | 0.15 | 0.91 | 0.44 | 0.36 |
| *III-9 | 0.7 | 0.7 | 0.2 | 0.15 | 0 | 0.13 | 0.38 | 0.16 | 0.92 | 0.4 | 0.27 |
| III-10 | 0.7 | 0.7 | 0.2 | 0.15 | 5 | 0.13 | 0.38 | 0.16 | 0.92 | 0.4 | 0.26 |
| III-11 | 0.7 | 0.7 | 0.2 | 0.15 | 15 | 0.13 | 0.38 | 0.16 | 0.92 | 0.4 | 0.27 |
| III-12 | 0.7 | 0.7 | 0.2 | 0.15 | 20 | 0.13 | 0.38 | 0.16 | 0.92 | 0.4 | 0.26 |
| III-13 | 0.7 | 0.7 | 0.2 | 0.3 | 10 | 0.11 | 0.39 | 0.15 | 0.89 | 0.43 | 0.3 |
| III-14 | 0.7 | 0.7 | 0.2 | 0.2 | 10 | 0.20 | 0.40 | 0.25 | 0.9 | 0.50 | 0.22 |

| Sample No. | CV of diameter of crystal grain % | After reduction firing IR (insulation resistance) Applied voltage 25 V Temperature: 25° C. Ω | Capacitance μF | After reoxidation IR (insulation resistance) Applied voltage 25 V Temperature: 25° C. Ω | Capacitance μF | Insulation resistance after the lapse of 100 hours in high temperature loading test Ω |
|---|---|---|---|---|---|---|
| *III-1 | 57 | Not measurable | 0.41 | 1.E+10 | 0.47 | 1.00E+05 |
| III-2 | 39 | 1.E+10 | 0.51 | 2.E+10 | 0.51 | 1.00E+07 |
| III-3 | 38 | 1.E+09 | 0.5 | 5.E+09 | 0.5 | 1.00E+07 |
| III-4 | 37 | 1.E+09 | 0.49 | 5.E+09 | 0.49 | 2.00E+07 |
| III-5 | 36 | 1.E+09 | 0.471 | 1.E+09 | 0.471 | 2.00E+07 |
| III-6 | 35 | 1.E+09 | 0.472 | 1.E+09 | 0.472 | 2.00E+07 |
| III-7 | 35 | 1.E+08 | 0.472 | 1.E+08 | 0.472 | 2.00E+07 |
| III-8 | 37 | 1.E+08 | 0.469 | 1.E+08 | 0.469 | 2.00E+07 |
| *III-9 | 45 | 1.E+09 | 0.47 | 1.E+09 | 0.47 | 4.00E+06 |
| III-10 | 40 | 1.E+09 | 0.48 | 1.E+09 | 0.48 | 7.00E+06 |

TABLE 6-continued

| III-11 | 39 | 1.E+09 | 0.47  | 1.E+09 | 0.47  | 8.00E+06 |
| III-12 | 39 | 1.E+09 | 0.455 | 1.E+09 | 0.455 | 1.00E+07 |
| III-13 | 35 | 1.E+09 | 0.472 | 1.E+09 | 0.472 | 2.00E+07 |
| III-14 | 39 | 1.E+09 | 0.471 | 1.E+09 | 0.471 | 5.00E+06 |

* Asterisked samples do not fall within the scope of the present invention.

As is obvious from the results in Table 6, the samples in which the dielectric layers were constituted by BT crystal grains and BCT crystal grains, the BT crystal grains contained Mg and the rare-earth element in larger amounts than those in the BCT crystal grains, and the variation coefficient of the BT crystal grains and the BCT crystal grains was 40% or less, had an insulation resistance of $1 \times 10^7$ Ω or more after the lapse of 100 hours in the high temperature loading test. These samples also had an insulation resistance of $10^8$ Ω or more after subjected to the firing and had a relative dielectric constant of 3500 or more after subjected to the reoxidation treatment.

In contrast, the sample in which the fine dielectric powder was not added had a variation coefficient of 45% and had a low insulation resistance of $4 \times 10^6$ Ω after the lapse of 100 hours in the high temperature loading test. Sample No. III-1 in which $V_2O_5$ was not added had a variation coefficient of 57% and the insulation resistance of this sample after the firing was not measurable.

The invention claimed is:

1. A multilayer ceramic capacitor comprising dielectric layers and internal electrode layers disposed alternately, the dielectric layers including a dielectric ceramic containing barium titanate as a main component, calcium, magnesium, vanadium, manganese, and any rare-earth element among dysprosium, holmium, erbium, and yttrium, wherein
    crystals constituting the dielectric ceramic include a first crystal group constituted by crystal grains containing the barium titanate as a main component and containing the calcium in a concentration of 0.2 atomic % or less and a second crystal group constituted by crystal grains containing the barium titanate as a main component and containing the calcium in a concentration of 0.4 atomic % or more;
    ratios (C2/C1) of concentrations (C2) of the magnesium and the rare-earth element contained in center portions of the crystal grains constituting the first crystal group to concentrations (C1) of the magnesium and the rare-earth element contained in surface layers of the crystal grains constituting the first crystal group are respectively larger than ratios (C4/C3) of concentrations (C4) of the magnesium and the rare-earth element contained in center portions of the crystal grains constituting the second crystal group to concentrations (C3) of the magnesium and the rare-earth element contained in surface layers of the crystal grains constituting the second crystal group; and
    b/(a+b) is 0.5 to 0.8 where, in a polished surface obtained by polishing a surface of the dielectric ceramic, a represents an area of the crystal grains constituting the first crystal group and b represents an area of the crystal grains constituting the second crystal group.

2. The multilayer ceramic capacitor according to claim 1, wherein the dielectric ceramic further contains zirconium.

3. The multilayer ceramic capacitor according to claim 1, wherein a content of the zirconium is 0.2 to 1 molar part in terms of $ZrO2$ based on 100 molar parts of a total amount of an oxide of the barium (BaO), an oxide of the calcium (CaO), and an oxide of the titanium (TiO2).

4. The multilayer ceramic capacitor according to claim 1, wherein a variation coefficient $(x/\sigma) \times 100$ (%) is 40% or less where x represents a mean diameter of the crystal grains constituting the first crystal group and the second crystal group and σ represents a standard deviation of diameters of the crystal grains.

5. The multilayer ceramic capacitor according to claim 1, wherein a mean diameter of the crystal grains constituting the first crystal group is larger than a mean diameter of the crystal grains constituting the second crystal group.

6. The multilayer ceramic capacitor according to claim 1, wherein the dielectric ceramic contains 0.5 to 1 mole of the magnesium in terms of MgO, 0.5 to 1 mole of the rare-earth element in terms of RE2O3, 0.1 to 0.3 moles of the manganese in terms of MnO, and 0.1 to 0.4 moles of the vanadium in terms of V2O5, based on 100 moles of titanium constituting the barium titanate; and a mean diameter of the crystal grains constituting the first crystal group is larger than a mean diameter of the crystal grains constituting the second crystal group.

7. The multilayer ceramic capacitor according to claim 1, wherein the dielectric ceramic contains 0.5 to 1 mole of the magnesium in terms of MgO, 0.5 to 1 mole of the rare-earth element (RE) in terms of RE2O3, 0.1 to 0.3 moles of the manganese in terms of MnO, and 0.1 to 0.4 moles of the vanadium in terms of V2O5, based on 100 moles of titanium constituting the barium titanate; the dielectric ceramic further contains zirconium; and a content of the zirconium is 0.2 to 1 molar part in terms of ZrO2 based on 100 molar parts of a total amount of an oxide of the barium (BaO), an oxide of the calcium (CaO), and an oxide of the titanium (TiO2).

8. The multilayer ceramic capacitor according to claim 1, wherein the dielectric ceramic contains 0.5 to 1 mole of the magnesium in terms of MgO, 0.5 to 1 mole of the rare-earth element (RE) in terms of RE2O3, 0.1 to 0.3 moles of the manganese in terms of MnO, and 0.1 to 0.4 moles of the vanadium in terms of V2O5, based on 100 moles of titanium constituting the barium titanate; and a variation coefficient $(x/\sigma) \times 100$ (%) is 40% or less where x represents a mean diameter of the crystal grains constituting the first crystal group and the second crystal group and σ represents a standard deviation of diameters of the crystal grains.

* * * * *